(12) United States Patent
Takahashi et al.

(10) Patent No.: US 10,349,099 B2
(45) Date of Patent: Jul. 9, 2019

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventors: Kazuyuki Takahashi, Chiba (JP); Lachlan Bruce Michael, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/313,346

(22) PCT Filed: Jun. 5, 2015

(86) PCT No.: PCT/JP2015/066290
§ 371 (c)(1),
(2) Date: Nov. 22, 2016

(87) PCT Pub. No.: WO2015/194395
PCT Pub. Date: Dec. 23, 2015

(65) Prior Publication Data
US 2017/0188063 A1 Jun. 29, 2017

(30) Foreign Application Priority Data
Jun. 20, 2014 (JP) .................................. 2014-127064

(51) Int. Cl.
H04H 20/42 (2008.01)
H04L 29/06 (2006.01)
(Continued)

(52) U.S. Cl.
CPC ....... *H04N 21/23611* (2013.01); *H04H 20/42* (2013.01); *H04L 29/06489* (2013.01);
(Continued)

(58) Field of Classification Search
CPC ........ H04L 29/06489; H04N 21/23611; H04N 21/2383; H04N 21/43; H04N 21/2351; H04N 21/23805; H04N 21/23424
(Continued)

(56) References Cited

U.S. PATENT DOCUMENTS

| 2004/0008736 | A1 | 1/2004 | Bae et al. | |
| 2007/0002871 | A1* | 1/2007 | Pekonen | H04L 29/06027 370/395.42 |
| 2008/0285579 | A1* | 11/2008 | Vare | H04H 20/16 370/412 |

FOREIGN PATENT DOCUMENTS

| CA | 2867988 A1 | 10/2013 |
| EP | 1326355 A2 | 7/2003 |

(Continued)

OTHER PUBLICATIONS

"Digital Video Broadcasting (DVB); Frame Structure Channel Coding and Modulation for a Second Generation Digital Terrestrial Television Broadcasting System (DVB-T2)", ETSI EN 302 755 V1.3.1, Apr. 2012, 188 pages.
(Continued)

*Primary Examiner* — On S Mung
(74) *Attorney, Agent, or Firm* — Oblon, McClelland, Maier & Neustadt, L.L.P.

(57) ABSTRACT

The present technology relates to a transmission device, a transmission method, a reception device, and a reception method that can improve transmission efficiency. An encoded signal is generated based on realtime data indicated by a waveform L using a predetermined fixed bit rate as a maximum code amount Sx and the encoded signal into which non-realtime data with an insufficient code amount is inserted is transmitted at the fixed bit rate, as indicated by a range Z12, when a code amount of the generated encoded signal is insufficient for the maximum code amount Sx. The
(Continued)

present technology can be applied to broadcasting communication.

13 Claims, 26 Drawing Sheets

(51) Int. Cl.
    *H04N 21/43*     (2011.01)
    *H04N 21/234*     (2011.01)
    *H04N 21/235*     (2011.01)
    *H04N 21/236*     (2011.01)
    *H04N 21/238*     (2011.01)
    *H04N 21/434*     (2011.01)
    *H04N 21/2343*     (2011.01)
    *H04N 21/2383*     (2011.01)

(52) U.S. Cl.
    CPC ........ *H04L 65/4076* (2013.01); *H04L 65/607* (2013.01); *H04N 21/2351* (2013.01); *H04N 21/2383* (2013.01); *H04N 21/23424* (2013.01); *H04N 21/23614* (2013.01); *H04N 21/23805* (2013.01); *H04N 21/234345* (2013.01); *H04N 21/43* (2013.01); *H04N 21/4346* (2013.01); *H04N 21/4348* (2013.01)

(58) Field of Classification Search
    USPC .................................................... 375/240.26
    See application file for complete search history.

(56) References Cited

FOREIGN PATENT DOCUMENTS

| | | | |
|---|---|---|---|
| JP | 2000500632 | A | 1/2000 |
| JP | 2000078577 | A | 3/2000 |
| JP | 2004-320302 | | 11/2004 |
| JP | 2004-320302 | A | 11/2004 |
| JP | 2010-517486 | | 5/2010 |
| JP | 2010-517486 | A | 5/2010 |
| JP | 2010-527175 | | 8/2010 |
| JP | 2010-527175 | A | 8/2010 |
| JP | 2011-166649 | | 8/2011 |
| JP | 2011-166649 | A | 8/2011 |
| JP | 2012-090039 | | 5/2012 |
| JP | 2012-090039 | A | 5/2012 |
| WO | 97/19560 | A1 | 5/1997 |
| WO | WO99/01987 | | 1/1999 |

OTHER PUBLICATIONS

Frame Structure Channel Coding and Modulation for a Second Generation Digital Terrestrial Television Broadcasting System (Dvb-T2), ETSI EN 302 755 V1.3.1, Apr. 2012, pp. 188.

Extended European Search Report of EP Application No. 15810135.2, dated Sep. 29, 2017, 11 pages of EESR.

Japanese Office Action dated Apr. 2, 2019 in Patent Application No. 2016-529238 with English translation, 14 pages.

* cited by examiner

TRANSMISSION DEVICE, TRANSMISSION METHOD, RECEPTION DEVICE, AND RECEPTION METHOD

CROSS REFERENCE TO RELATED APPLICATIONS

This application is a U.S. National Phase of International Patent Application No. PCT/JP2015/066290 filed on Jun. 5, 2015, which claims priority benefit of Japanese Patent Application No. JP 2014-127064 filed in the Japan Patent Office on Jun. 20, 2014. Each of the above-referenced applications is hereby incorporated herein by reference in its entirety.

TECHNICAL FIELD

The present technology relates to a transmission device, a transmission method, a reception device, and a reception method, and particularly, to a transmission device, a transmission method, a reception device, and a reception method capable of realizing highly efficient transmission and reception by replacing null packets included in broadcasting signals transmitted at a fixed bit rate with asynchronous signals in a physical layer.

BACKGROUND ART

Bandwidths of a physical layer (PHY) generally used for broadcasting are fixed bit rates. That is, normal digital broadcasting signals are decided to be transmitted from transmission devices to reception devices within constant delay times in accordance with buffer models. In order to realize this, encoding of a broadcasting signal formed of a video and audio is controlled so that quality (mainly image quality) of each program is optimized in a range in which a generated code amount of a program of a plurality of programs with variable length bit rates do not exceed a fixed bit rate of the physical layer.

At this time, a null packet is inserted into portions in which a code amount is insufficient for the fixed bit rate to be adjusted to the fixed bit rate.

In the physical layer, a generated code amount decreases according to a header compression technology or a variable length header technology. However, when the code amount is insufficient for the fixed bit rate, a null packet may be inserted.

Incidentally, in Advanced Television System Committee (ATSC) 3.0 or the like, a restricted bandwidth is requested to be efficiently used. Thus, since null packets which are invalid data cause a reduction in transmission efficiency, it is preferable not to use the null packets.

Ideally, the same generated code amount as a bandwidth ensured in the physical layer is considered to be allocated. Incidentally, since a generated code amount varies every moment in transmission of digital broadcasting, it is necessary to control the generated code amount with high precision in realtime. Thus, the allocation of the same generated code amount as the bandwidth ensured in the physical layer was not practical.

Accordingly, for example, in Digital Video Broadcasting Terrestrial Second Generation (DVB-T2), null packet deletion is realized to detect null packets in the physical layer and delete the null packets (see Non-Patent Literature 1). In this scheme, plural connection is realized in a seemingly widened bandwidth and a more code amount can be generated.

CITATION LIST

Non-Patent Literature

Non-Patent Literature 1: ETSI EN 302 755 V1.3.1 (2012-04)

SUMMARY OF INVENTION

Technical Problem

However, a scheme of controlling a generated code amount according to a code amount allowed in the physical layer even when the above-described null packet deletion is used has not been established. Therefore, it is difficult to control an optimum code amount while ensuring delay of realtime data in which a delay time up to encoding and decoding has to be within a constant time as in broadcasting signals to be constantly maintained.

It is particularly desirable to improve communication efficiency by inserting packets formed of non-realtime data instead of null packets to reduce the number of null packets.

Solution to Problem

According to a first aspect of the present technology, there is provided a transmission device that generates an encoded signal based on realtime data using a predetermined fixed bit rate as a maximum code amount and transmits the encoded signal into which non-realtime data with an insufficient code amount is inserted when a code amount of the generated encoded signal is insufficient for the maximum code amount.

According to the first aspect of the present technology, an encoded signal is generated based on realtime data using a predetermined fixed bit rate as a maximum code amount, and the encoded signal into which non-realtime data with an insufficient code amount is inserted is transmitted when a code amount of the generated encoded signal is insufficient for the maximum code amount.

According to a second aspect of the present technology, there is provided a reception device that receives an encoded signal which is generated by encoding realtime data using a predetermined fixed bit rate as a maximum code amount and into which non-realtime data with an insufficient code amount is inserted when a code amount of the generated encoded signal is insufficient for the maximum code amount.

According to the second aspect of the present technology, an encoded signal which is generated by encoding realtime data using a predetermined fixed bit rate as a maximum code amount and into which non-realtime data with an insufficient code amount is inserted when a code amount of the generated encoded signal is insufficient for the maximum code amount is received.

According to a third aspect of the present technology, there is provided a transmission device including: an encoding unit configured to generate an encoded signal by encoding realtime data to be transmitted within a constant delay time so that a predetermined fixed bit rate becomes a maximum code amount and insert a null packet at a code amount insufficient for the fixed bit rate; a packet generation unit configured to execute packetizing by deleting the null packet in the encoded signal of the realtime data; a non-realtime data supply unit configured to supply a packet of non-realtime data corresponding to a code amount of the null packet deleted by the packet generation unit; a frame data generation unit configured to generate frame data with a predetermined length based on a packet of the realtime data and the packet of the non-realtime data; and a transmission unit configured to transmit the frame data.

The encoding unit can generate the encoded signal by controlling the code amount so that quality of each broadcasting program is optimized in a range which does not exceed the maximum code amount of the predetermined fixed bit rate from a statistical code amount of the realtime data of a plurality of broadcasting programs.

The encoding unit can generate the encoded signal by controlling the code amount so that quality of each broadcasting program is optimized in a range which does not exceed the maximum code amount of the predetermined fixed bit rate from a statistical code amount of the realtime data of a plurality of broadcasting programs, and can include a null packet insertion unit that inserts the null packet when the code amount is insufficient for the maximum code amount.

The packet generation unit can further include a null packet deletion unit that deletes the null packet in the encoded signal of the realtime data.

The packet generation unit can supply the non-realtime data supply unit with information regarding a code amount of the null packet deleted from the encoded signal of the realtime data by the null packet deletion unit.

A non-realtime data buffer configured to store the non-realtime data can be further included. The non-realtime data supply unit can request the non-realtime data with a code amount corresponding to the code amount of the null packet deleted from the encoded signal of the realtime data from the non-realtime data buffer, and can acquire the non-realtime data with the code amount corresponding to the code amount of the deleted null packet in response to the request from the non-realtime data buffer, and supply the non-realtime data to the frame data generation unit.

The frame data generation unit can generate frame data with a predetermined length based on the packet of the realtime data and the packet of the non-realtime data, and a null packet insertion unit configured to insert the null packet when the frame data is insufficient for the maximum code amount of the predetermined bit rate can be further included.

A multiplexing unit configured to multiplex the realtime data and the non-realtime data to generate a multiplexed signal; and a demultiplexing unit configured to demultiplex the multiplexed signal generated by the multiplexing unit into the realtime data and the non-realtime data can be further included.

According to the third aspect of the present technology, there is provided a transmission method including: generating an encoded signal by encoding realtime data to be transmitted within a constant delay time so that a predetermined fixed bit rate becomes a maximum code amount and inserting a null packet at a code amount insufficient for the fixed bit rate; executing packetizing by deleting the null packet in the encoded signal of the realtime data; supplying a packet of non-realtime data corresponding to a code amount of the deleted null packet; generating frame data with a predetermined length based on a packet of the realtime data and the packet of the non-realtime data; and transmitting the frame data.

According to the third aspect of the present technology, an encoded signal is generated by encoding realtime data to be transmitted within a constant delay time so that a predetermined fixed bit rate becomes a maximum code amount and a null packet is inserted at a code amount insufficient for the fixed bit rate; packetizing is executed by deleting the null packet in the encoded signal of the realtime data; a packet of non-realtime data corresponding to a code amount of the deleted null packet is supplied; frame data with a predetermined length is generated based on a packet of the realtime data and the packet of the non-realtime data; and the frame data is transmitted.

According to a fourth aspect of the present technology, there is provided a reception device including: a reception unit configured to receive frame data with a predetermined length which is generated based on a packet of realtime data which is transmission data to be transmitted within a constant delay time and is put into an encoded signal so that a predetermined fixed bit rate becomes a maximum code amount and a packet of non-realtime data with a code amount insufficient for the maximum code amount; a demultiplexing unit configured to demultiplex the frame data with the predetermined length received by the reception unit into the packet of the realtime data and the packet of the non-realtime data; a realtime data output unit configured to output the realtime data based on the packet of the realtime data; and a non-realtime data output unit configured to output the non-realtime data based on the packet of the non-realtime data.

According to the fourth aspect of the present technology, there is provided a reception method including: receiving frame data with a predetermined length which is generated based on a packet of realtime data which is transmission data to be transmitted within a constant delay time and is put into an encoded signal so that a predetermined fixed bit rate becomes a maximum code amount and a packet of non-realtime data with a code amount insufficient for the maximum code amount; demultiplexing the frame data with the predetermined length received by the reception unit into the packet of the realtime data and the packet of the non-realtime data; outputting the realtime data based on the packet of the realtime data; and outputting the non-realtime data based on the packet of the non-realtime data.

According to the fourth aspect of the present technology, frame data with a predetermined length which is generated based on a packet of realtime data which is transmission data to be transmitted within a constant delay time and is put into an encoded signal so that a predetermined fixed bit rate becomes a maximum code amount and a packet of non-realtime data with a code amount insufficient for the maximum code amount is received; the frame data with the predetermined length received by the reception unit is demultiplexed into the packet of the realtime data and the packet of the non-realtime data; the realtime data is output based on the packet of the realtime data; and the non-realtime data is output based on the packet of the non-realtime data.

Advantageous Effects of Invention

According to the present technology, it is possible to realize highly efficient transmission and reception by replacing null packets included in broadcasting signals transmitted at a fixed bit rate with asynchronous signals in the physical layer.

DESCRIPTION OF EMBODIMENT(S)

Figure 1:
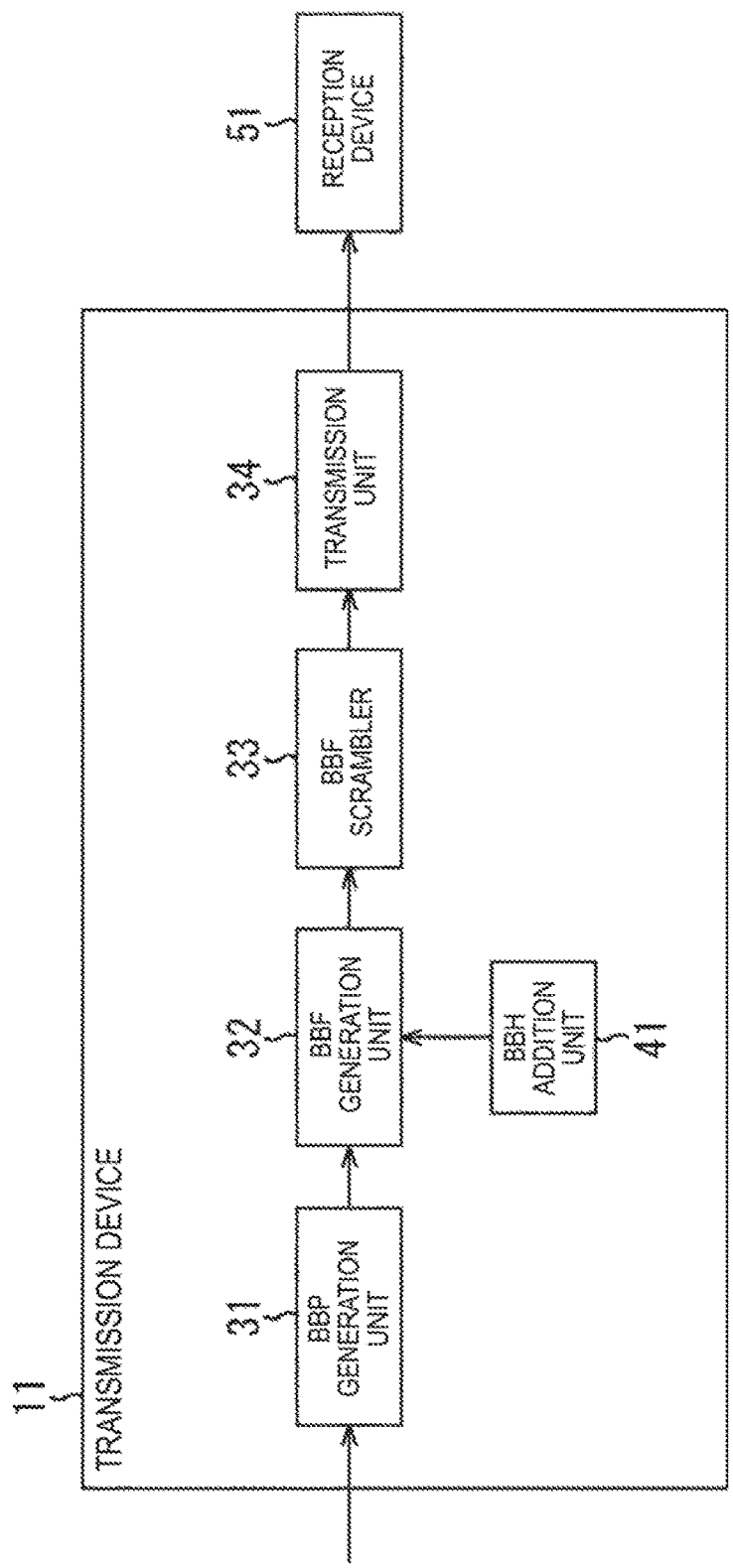
FIG. 1 is an explanatory diagram illustrating a first configuration example of a transmission device to which the present technology is applied.

The description will be made in the following order.
1. First embodiment (example in which null packets are used without change)
2. Second embodiment (example in which asynchronous data is inserted into null packets)

<1. First Embodiment>
<Communication Technology for Broadcasting Signal>

With digitization of broadcasting signals and development of communication technologies, content including a video, audio, or the like can be transmitted in both of broadcasting and communication.

In broadcasting, content can be simultaneously transmitted to many users stably, but communication is executed only unidirectionally. In communication, however, content can be transmitted bidirectionally upon request, but content may not be transmitted stably because of occurrence of network congestion.

Accordingly, in broadcasting, technologies capable of transmitting a large variety of content and realizing bidirectional communication by transmitting the content using IP packets widely used for communication have also been proposed. As one of the technologies, for example, Digital Video Broadcasting-Terrestrial Second Generation (DVB-T2) can be exemplified (for example, see ETSI EN 302 755 V1.3.1 (2012-04)).

Additionally, broadcasting schemes capable of transmitting IP packets have been proposed. For example, altitude Broadcasting Satellite (BS) digital broadcasting, Integrated Services Digital Broadcasting-Terrestrial Sound Broadcasting (ISDB-TSB), Digital Video Broadcasting-Satellite Second Generation (DVB-S2), and Advanced Television System Committee-Digital Television (ATSC-DTV) can be exemplified.

In the above-described broadcasting schemes that are also capable of transmitting IP packets, for example, Type Length Value (TLV) packets, Transport Stream (TS) packets, Generic Stream Encapsulation (GSE) packets (in both of DVB-T2 and DVB-S2), and TS packets in formats at the time of multiplexing are used in the case of altitude digital BS broadcasting, ISDB-T, DVB-T2, DVB-S2, and ATSC-DTV. Here, in ISDB-TSS and ATSC-DTV using TS packets, when IP packets are transmitted, the IP packets are encapsulated in TS packets to be transmitted in schemes such as Unidirectional Lightweight Encapsulation (ULE) and Multi-Protocol Encapsulation (ATSC-MPE). In other schemes, IP packets are transmitted without using TS packets.

When packets for broadcasting content and IP packets are transmitted in a mixed manner, packets with various packet lengths are circulated. That is, the packet length of an IP packet considered to be the minimum in control information or the like is 40 bytes (B) in Transmission Control Protocol/Internet Protocol (TCP/IP) and is 28 bytes (B) in User Datagram Protocol/Internet Protocol (UDP/IP). For a TS packet, the packet length is fixed to, for example, 188 bytes. Further, there is an IP packet of which an intermediate packet length is about 576 bytes. On the other hand, a maximum transmission unit (MTU) of an IP packet is 1500 bytes.

In this way, various packet lengths of IP packets are exemplified. Incidentally, in statistics of packet lengths actually used for broadcasting schemes that are also capable of transmitting IP packets, tendencies to use packets with minimum and maximum sizes most frequently and to use packets with intermediate sizes relatively less have been confirmed.

Accordingly, when the number of bits is set so that information with a maximum packet length can be stored in a header in a broadcasting scheme in which IP packets are included, there are many packets in which high-order bits are not used among the bits set for the packet lengths in headers at the time of transmission of the IP packets with several bytes.

That is, actually, when the number of bits capable of storing information corresponding to a maximum packet length is prepared in the headers of packets despite the fact that a circulation amount of the packets with small packet lengths is a frequency of some extent, high-order bits are not used in packets with packet lengths of which a use frequency is relatively high. As a result, there is a concern of the headers being redundant in the circulated packets.

Accordingly, a technology for reducing redundancy of the headers of packets to improve communication efficiency by setting the number of bits storing information regarding packet lengths in the headers of the packets according to the packet lengths and realizing use according to the packet lengths will be described.

<Configuration Example of First Transmission Device>

FIG. 1 is an explanatory diagram illustrating a configuration example of a transmission device to which the present technology is applied. For example, a transmission device 11 transmits various input packets configured of transport stream (TS) packets which are broadcasting signals, IP packets, and other packets such as bit stream packets to a reception device to be described with reference to FIG. 2. At this time, the transmission device 11 generates baseband packets (BBPs) by collecting the plurality of input packets. At this time, the transmission device 11 suppresses redundancy of the header of a BBP by preparing a plurality of numbers of bits as the numbers of bits necessary to express a packet length in the header of the BBP and configuring the header of the BBP to be switched according to the packet size of the BBP.

More specifically, the transmission device 11 includes a BBP generation unit 31, a baseband frame (BBF) generation unit 32, a BBF scrambler 33, and a transmission unit 34. Further, the BBF generation unit 32 includes a BBF header (BBH) addition unit 41.

The BBP generation unit 31 identifies the types of input packets, generates BBPs by collecting the plurality of input packets according to the identified types, and supplies the generated BBPs to the BBF generation unit 32. At this time, the BBP generation unit 31 can switch and set the number of bits for expressing the packet lengths of the BBPs in the headers of the BBPs to a plurality of kinds of bits and switches the number of bits in accordance with the packet lengths of the input packets. As a result, it is possible to suppress the redundancy of the headers caused due to the change in the packet lengths of the BBPs. The details of the BBPs generated by the BBP generation unit 31 will be described below with reference to FIG. 3 and the subsequent drawings.

The BBF generation unit 32 generates BBFs by collecting the BBPs necessary for a predetermined frame length to be realized and supplies the generated BBFs to the BBF scrambler 33. At this time, the BBF generation unit 32 controls the BBH addition unit 41 such that the BBH addition unit 41 generates and adds BBHs which are the headers of the BBFs.

The BBF scrambler 33 scrambles the BBFs generated by the BBF generation unit 32 and supplies the scrambled BBFs to the transmission unit 34.

The transmission unit 34 transmits the scrambled BBFs to a reception device via a network or a broadcasting network.

<Configuration Example of First Reception Device>

Figure 2:
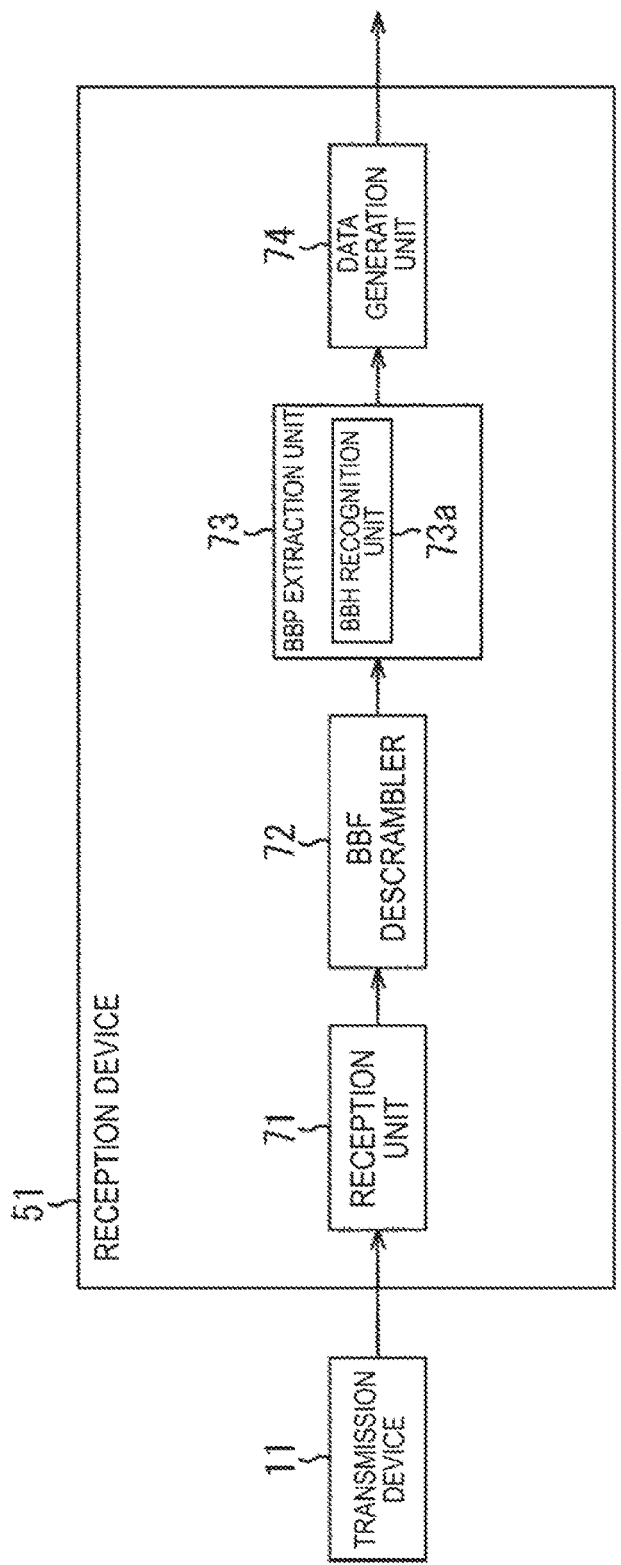
FIG. 2 is an explanatory diagram illustrating a first configuration example of a reception device to which the present technology is applied.

FIG. 2 illustrates a first configuration example of a reception device that receives the BBFs transmitted from the transmission device 11 described with reference to FIG. 1, generates BBPs from the BBFs, and further generates the input packets from the BBPs and outputs the input packets.

More specifically, a reception device 51 in FIG. 2 includes a reception unit 71, a BBF descrambler 72, a BBP extraction unit 73, and a data generation unit 74. The reception unit 71 receives the BBFs transmitted from the transmission device 11 via the network or the broadcasting network and supplies the BBFs to the BBF descrambler 72.

The BBF descrambler 72 descrambles the scrambled BBFs supplied from the reception unit 71 to form the BBFs which are in an unscrambled state and supplies the BBFs to the BBP extraction unit 73.

The BBP extraction unit 73 includes a BBH recognition unit 73a. The BBP extraction unit 73 controls the BBH recognition unit 73a such that the BBH recognition unit 73a recognizes information regarding the BBHs which are the headers of the BBFs. The BBP extraction unit 73 extracts the BBPs from the BBFs based on the recognized information regarding the BBHs and supplies the BBPs to the data generation unit 74.

The data generation unit 74 restores and generates the input packets input to the transmission device 11 which is a transmission source from the BBPs supplied from the BBP extraction unit 73, and outputs the packets.

<Configuration of BBP>

Next, the configuration of the BBP generated based on the input packet by the BBP generation unit 31 of the transmission device 11 will be described with reference to FIG. 3.

The BBP is configured to include a header and a data field that configures a BBP payload. In FIG. 3, the header is formed by combining configurations excluding a data field (Data Field) DF that configures a payload in the lowermost stage from the drawing and a deletion Number-of-TS-packets portion DNPC to be described below. The header of the BBP can be used in such a manner that the number of bits for storing a packet length is switched to 3 kinds of bits according to the packet length of the BBP.

Figure 3:
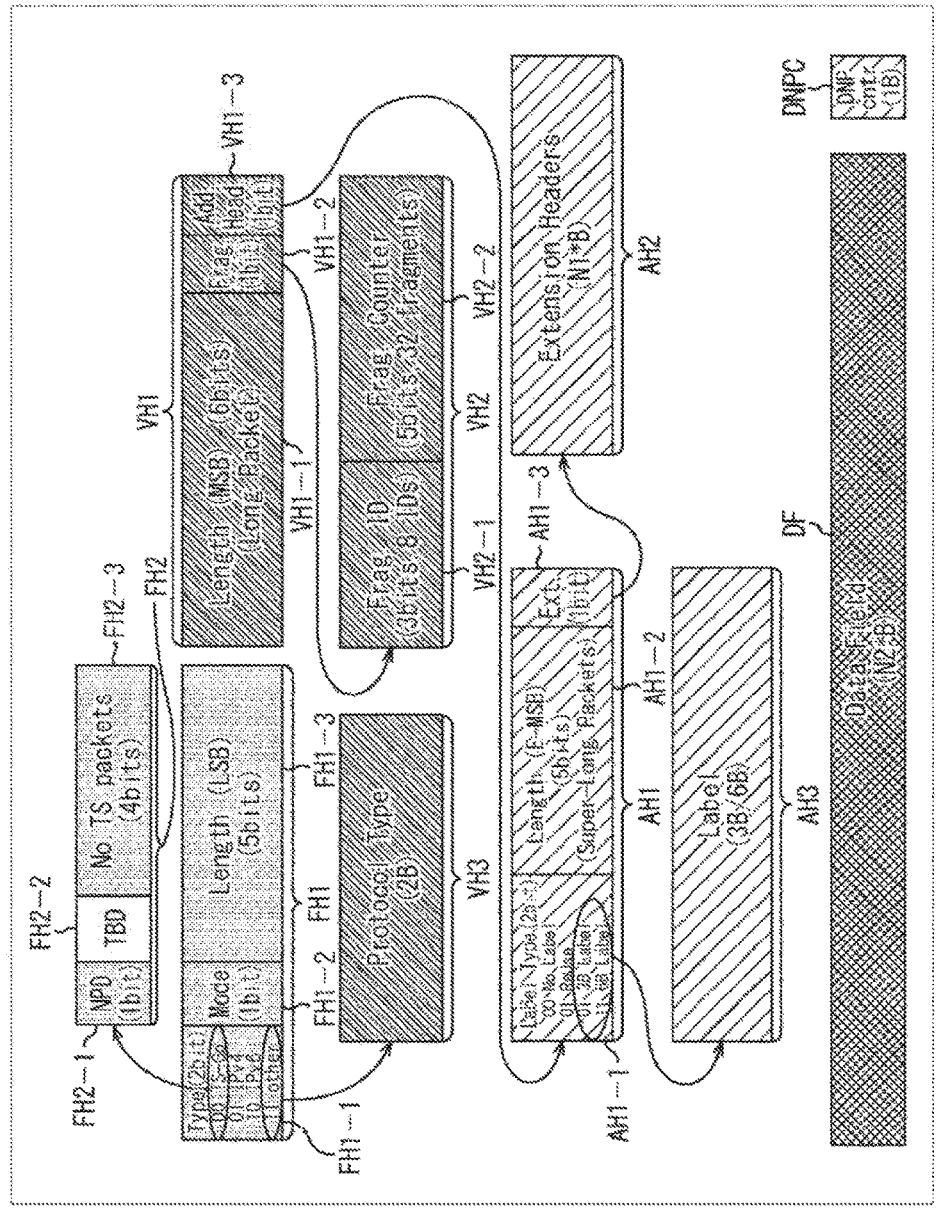
FIG. 3 is an explanatory diagram illustrating a configuration example of the header of a BBP.

When the input packet has a minimum fixed length, the header is a minimum fixed length header FH1 illustrated in the second stage from the top left of FIG. 3. The minimum fixed length header FH1 is configured with 1 byte (8 bits). The minimum fixed length header FH1 is configured to include a 2-bit type identification portion (Type) FH1-1, a 1-bit mode identification portion (Mode) FH1-2, and a 5-bit packet length portion (Length (LSB)) FH1-3.

The type identification portion FH1-1 is used to indicate a type of input packet. More specifically, the type identification portion FH1-1 is used to identify four types of input packets with 2 bits, as illustrated in FIG. 3. When the type identification portion FH1-1 is 00, 01, 10, and 11 in the example of FIG. 3, the types of each input packet indicate TS-Gp (group of Transport Stream (TS) packets), Internet Protocol version 4 (IPv4), Internet Protocol version 6 (IPv6), and others (other).

The other remaining 6-bit configuration of the minimum fixed length header FH1 varies according to the type identified in the type identification portion FH1-1. That is, when the type identification portion FH1-1 is one of 01, 10, and 11, that is, the type designated by the type identification portion FH1-1 is IPv4, IPv6, and others (other), the configuration illustrated in the second stage from the top left of FIG. 3 is formed. That is, the other remaining configuration is formed of 1 bit of the mode identification FH1-2 indicating whether a mode is a short packet (SP) mode and 5 bits of the packet length portion FH1-3 indicating a packet length of an IP packet from the left side.

The short packet mode is a mode of the header of the BBP in which the header is configured of only the minimum fixed length header FH1. Here, when the mode identification portion FH1-2 stores 1, the mode is indicated to be the short packet mode. When the mode identification portion FH1-2 stores 0, the mode is indicated not to be the short packet mode. For example, when the mode identification portion FH1-2 stores 1, the mode is the short packet mode. Therefore, the header is configured of only the minimum fixed length header FH1. The BBP is configured by adding the data field DF configuring the BBP payload to the minimum fixed length header FH1.

Accordingly, in this case, the packet length of the data field DF serving as the payload is expressed with a maximum of 5 bits. Here, an actual packet length is the number of bits greater than 5 bits. This is because the packet length is expressed with 5 bits by offsetting a minimum value of the packet length.

In contrast, when the mode identification portion FH1-2 stores 0, that is, the mode is not the short packet (SP) mode and the header is not merely the minimum fixed length header FH1, a variable length header VH1 illustrated in the top right of FIG. 3 is added to the minimum fixed length header FH1 to configure a header.

The variable length header VH1 is configured with 1 byte (8 bits). More specifically, the variable length header VH1 is configured to include a 6-bit packet length portion (Length (MSB)) VH1-1, a 1-bit frag portion (Frag.) VH1-2, and a 1-bit additional header identification portion (Add Head) VH1-3.

The packet length portion VH1-1 stores 6 high-order bits indicating the packet length of the BBP. On the other hand, here, 5 low-order bits are stored by the 5-bit packet length portion FH1-3 of the minimum fixed length header FH1. Accordingly, in this case, the packet length of the BBP is stored as information of a sum of 11 bits.

The frag portion VH1-2 stores information indicating presence or absence of a fragmentation mode in which the input packet is fragmented and the BBP is configured. More specifically, the frag portion VH1-2 stores 0 when a mode is not the fragmentation mode in which the input packet is fragmented and the BBP is configured. The frag portion VH1-2 stores 1 when the mode is the fragmentation mode. Further, when 1 is stored in the frag portion VH1-2 and the mode is indicated to be the fragmentation mode, a frag header VH2 illustrated in the second stage from the top right of FIG. 3 is added in addition to the variable length header VH1.

The frag header VH2 is configured with 1 byte (8 bits) and is configured to include a 3-bit frag ID portion (Frag. ID) VH2-1 that stores an IP packet which is a fragmentation source and a frag counter portion (Frag. Counter) VH2-2 that stores a fragmentation number to identify a 5-bit individual fragmented payload.

The additional header identification portion VH1-3 stores information indicating presence or absence of an additional header AH1 or a protocol type header VH3. When there is no additional header AH1 or protocol type header VH3, the additional header identification portion VH1-3 stores 0. When there is the additional header AH1 or the protocol type header VH3, the additional header identification portion VH1-3 store 1. Further, when 1 is stored in the additional header identification portion VH1-3, for example, an additional header AH1 illustrated in the third stage from the bottom left of FIG. 3 or a protocol type header VH3 illustrated in the third stage from the top left is added.

The additional header AH1 is configured with 1 byte (8 bits) and is configured to include a 2-bit label type portion (Label Type) AH1-1, a 5-bit packet length portion (Length (E-MSB)) AH1-2, and a 1-bit extension header identification portion (Ext.) AH1-3.

The label type portion (Label Type) AH1-1 stores information identifying a type of label additionally stored as a header. The packet length portion AH1-2 stores information of 5 most significant bits indicating the packet length of the BBP.

Accordingly, in this case, for the packet length of the BBP, the packet length portion FH1-3 of the minimum fixed length header FH1 stores 5 least significant bits, the packet length portion VH1-1 of the variable length header VH1 stores 6 high-order bits of the 5 least significant bits, and the packet length portion AH1-2 of the additional header AH1 stores 5 most significant bits. As a result, in the header of the BBP, the information regarding the packet length is stored as 16-bit information.

That is, in expression of the packet length, the configuration of the header can be switched and set to a first mode realized from the 5-bit packet length portion FH1-3 of the minimum fixed length header FH1, a second mode realized from 11 bits obtained by adding 6 bits of the packet length portion VH1-1 of the variable length header VH1, and a third mode realized from 16 bits obtained by further adding 5 bits of the packet length portion AH1-2 of the additional header AH1.

As a result, since the number of bits set in the packet length portions in the header of the BBP can be adjusted in three steps according to the packet length of the BBP, the number of bits of the packet length portions can be increased or decreased as necessary. As a result, it is possible to suppress the redundancy of the BBP, and thus it is possible to improve a communication speed. Hereinafter, the first mode is referred to as a short packet mode, the second mode is referred to as a variable length mode, and the third mode is referred to as an additional variable length mode. Further, in this example, an example in which three kinds of bit lengths, 5 bits, 11 bits, and 16 bits, are provided in advance to store the packet length will be described. More kinds of numbers of bits may be set as bits for storing the packet lengths and the redundancy may be further reduced by increasing alternatives in this way.

As illustrated in FIG. 3, the label type portion AH1-1 stores information for identifying four types of labels added to the header with 2 bits. More specifically, in the example of FIG. 3, when the label type portion AH1-1 stores 00, 01, 10, and 11, the types of labels to be added indicate No.Label (no addition of a label), ReUse (reuse of a previous label), 3BLabel (a label with a 3-byte length), and 6BLabel (a label with a 6-byte length). The label mentioned here is, for example, a media access control (MAC) address for identifying a device. Further, when the label type portion AH1-1 stores 10 or 11, that is, a label with a 3-byte length or a label with a 6-byte length is added, a 3-byte or 6-byte label header (Label) AH3 is added to the rear of the additional header AH1, as illustrated in the second stage from the bottom left of FIG. 3.

The extension header identification portion AH1-3 stores information indicating presence or absence of an extension header AH2. More specifically, when there is no extension header AH2, the extension header identification portion AH1-3 stores 0. When there is an extension header AH2, the extension header identification portion AH1-3 stores 1. As illustrated in the second stage from the bottom right of FIG. 3, the extension header AH2 formed of any N1 byte is added to the additional header AH1. The extension header (Extension Headers) AH2 stores any header information.

Further, when the type identification portion FH1-1 is 11 and the designated type is others (other) which is not IPv4, IPv6, and the like in the minimum fixed length header FH1, 2 bytes of the protocol type header (Protocol Type) VH3 illustrated in the third stage from the top left of FIG. 3 are added.

More specifically, for example, when 3 low-order bits in the protocol type header VH3 store 000, 001, 010, 011, 100, 101, and 110, the respective protocol types indicate Signaling, IPv4 Non Real Time (NRT) (Header Compression), IPv6 NRT (Header Compression), TS NRT (Header Compression), IPv4 NRT, IPv6 NRT, and TS NRT. Here, in the NRT, non-realtime data is set as a target. For example, the non-realtime data is different from data which is necessarily processed in realtime like broadcasting signals (data which is necessarily processed within a constant delay time) and indicates, for example, a parity, additional data, or data of accumulation type content which may not necessarily be handled in realtime. Further, Header Compression indicates whether the protocol type is set in a header subjected to a header compression process. That is, for example, IPv6 NRT (Header Compression) indicates handling of data in non-realtime and IPv6 in which a header compression process is executed. For example, IPv6 NRT indicates handling of data in non-realtime and IPv6 in which a header compression process is not executed. The protocol type header VH3 becomes an empty region in regard to other values of the above-described 2 bytes.

When the type identification portion FH1-1 is 00 and the designated information is the TS packet (TS-Gp), 6 bits other than 2 bits of the type identification portion FH1-1 in the minimum fixed length header FH1 have the configuration of the TS header FH2 illustrated in the top left of FIG. 3.

The TS header FH2 is matched with the type identification portion FH1-1 and is configured with 1 byte (8 bits), and is configured to include a 1-bit null packet identification portion FH2-1 indicating whether a mode is null packet deletion mode in which null packets are deleted and a 4-bit Number-of-TS-packets portion FH2-3 indicating the number of TS packets configuring the payload of the BBP. Further, 1 bit is an empty bit (TBD) FH2-2. Here, at the time of generation of the BBP, the null packet identification portion FH2-1 stores 0 when the mode is not the null packet deletion mode in which the null packets are deleted from the payload. The null packet identification portion FH2-1 stores 1 when the mode is the null packet deletion mode. When the mode is the null packet deletion mode, a 1-byte deletion Number-of-TS-packets portion DNPC indicating the number of deleted TS packets is further added to the rear of the data field DF.

Hereinafter, a mode in which the input packet is the TS packet is referred to as a TS mode. In FIG. 3, the TS header FH2 is configured to include the null packet identification portion FH2-1, the 4-bit Number-of-TS-packets portion FH2-3 indicating the number of TS packets configuring the payload of the BBP, and the empty bit (TBD) FH2-2. Hereinafter, a 1 byte further including 2 bits of the type identification portion FH1-1 is also referred to as the TS header FH2.

<Configuration Example of BBF Formed of BBP in Variable Length Mode>

Next, a configuration example of the BBF formed of the BBP in the variable length mode will be described with reference to FIG. 4.

Figure 4:
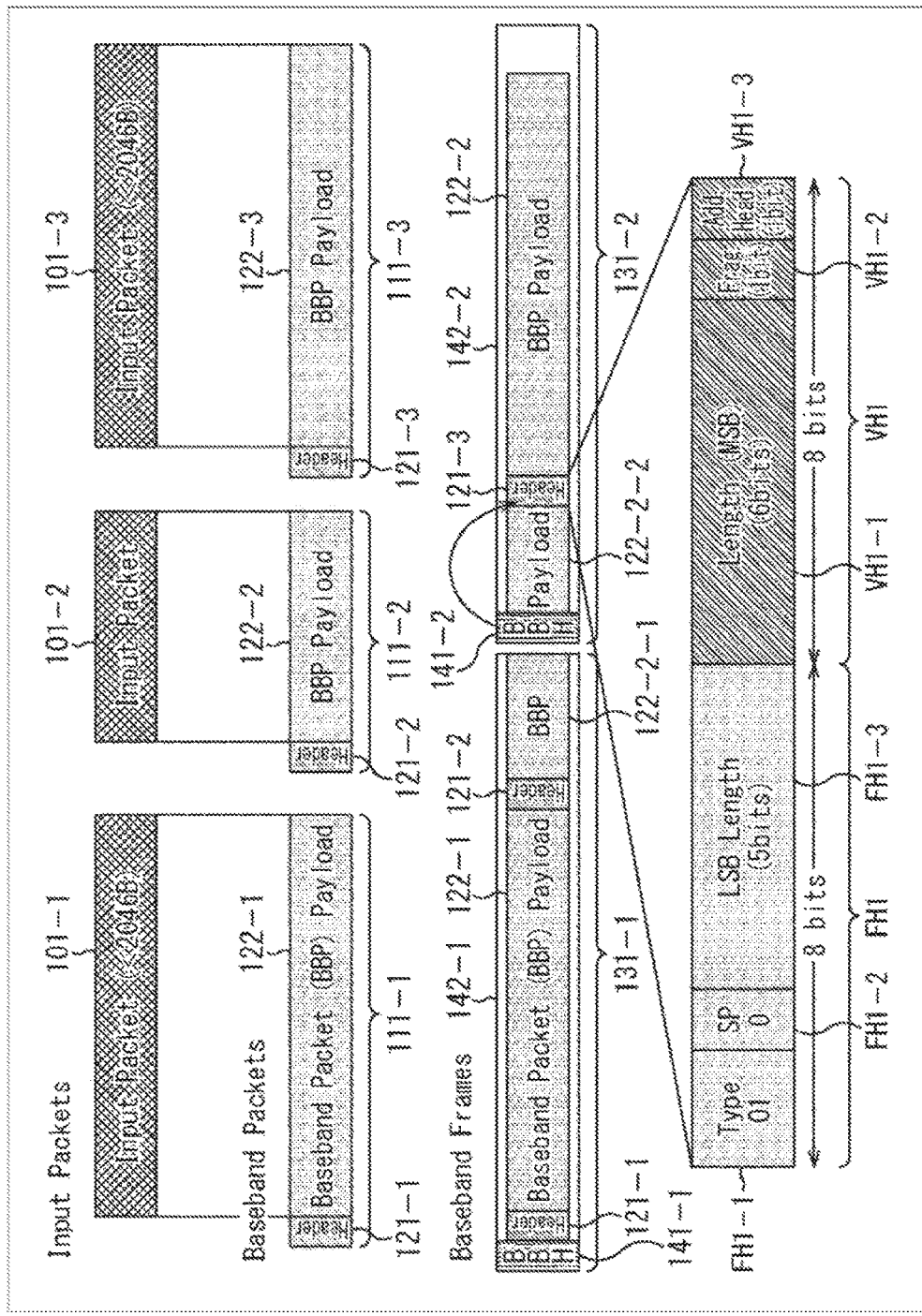
FIG. 4 is an explanatory diagram illustrating a configuration example of a BBP and a BBF in a variable length mode.

As illustrated in the uppermost stage of FIG. 4, input packets 101-1 to 101-3 are assumed to be input. Here, when it is not necessary to individually distinguish the input packets 101-1 to 101-3 from each other, the input packets 101-1 to 101-3 are simply referred to as the input packets 101 and are similarly referred to as the input packets 101 in other configurations. The input packets 101 are assumed to be IP packets corresponding to IPv4 and to be less than 2046 bytes, that is, a packet length is assumed to be a packet length which can be expressed by 11 bits in units of bytes.

In this case, as illustrated in the second stage from the top of FIG. 4, baseband packets (BBPs) 111-1 to 111-3 in which headers 121-1 to 121-3 are provided and BBP (Payload) payloads 122-1 to 122-3 are added are generated in regard to the input packets 101-1 to 101-3. Here, the BBP payloads 122 are the input packets 101.

The header 121 has a configuration illustrated in the lowermost stage of FIG. 4. In the drawing, details of the header 121 of the BBP 111 stored in the BBF 131 in the second stage from the bottom of the drawing are illustrated and have the same configuration as those of the header 121 of the BBP 111 illustrated in the second stage from the top.

That is, in the packet length of the BBP, 11 bits are necessary because 2048 bytes are the maximum. Therefore, the header 121 is in the variable length mode, and thus is configured to include the minimum fixed length header FH1 and the variable length header VH1. More specifically, 01, 0, and the information regarding the 5-bit packet length of the input packet are stored in the type identification portion (Type) FH1-1, the mode identification portion (SP) FH-2, and the packet length portion (LSB Length) FH-3 of the minimum fixed length header FH1, respectively. That is, the minimum fixed length header FH1 in FIG. 4 indicates that the input packet is an IPv4 packet and the mode is not the short packet mode, and thus the information regarding the 5-bit packet length is stored as the 5 low-order bits of the packet length of the BBP.

Further, 6 bits of the packet length, 0, and 0 are stored in the packet length portion VH1-1, the frag portion VH1-2, and the additional header identification portion VH1-3 of the variable length header VH1, respectively. That is, the variable length header VH1 in FIG. 4 indicates that the 6 high-order bits of the packet length of the BBP which is the input packet are stored, the mode is not the fragmentation mode, and there is no additional header.

Further, the packet length of the input packet with up to 2048 bits expressible with 11 bits can be expressed by the packet length portions FH1-1 and VH1-1.

The BBF generation unit 32 converts the BBPs illustrated in the second stage from the top of FIG. 4 into the BBFs 131-1 and 131-2 illustrated in the third stage from the top of FIG. 4.

Figure 5:
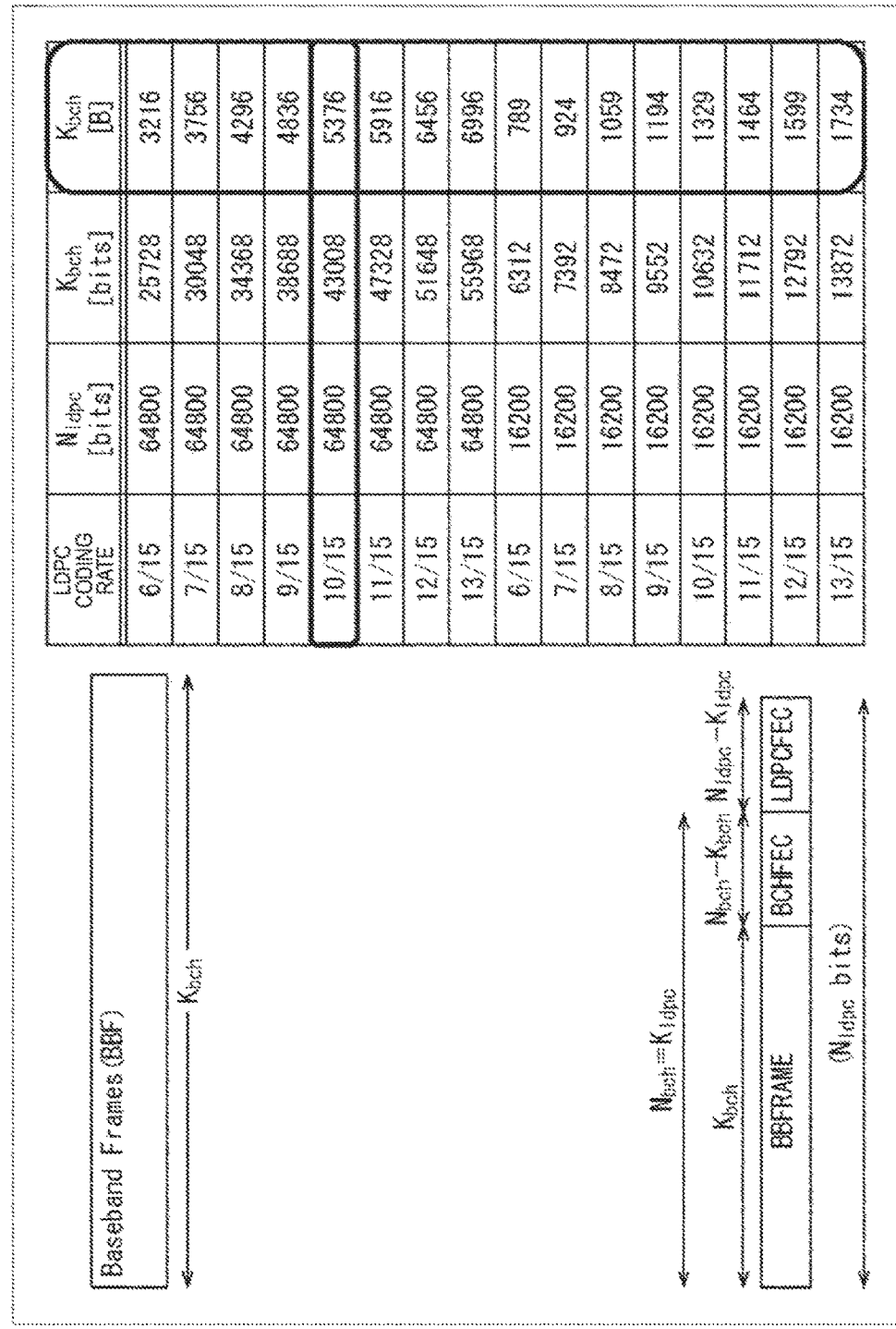
FIG. 5 is an explanatory diagram illustrating a frame length of the BBF.

That is, the BBFs 131-1 and 131-2 are configured to include headers (BBHs) 141-1 and 141-2 and BBF payloads 142-1 and 142-2, respectively. The frame length of the BBF 131 is specified by a code length and a coding rate. That is, for example, the frame length of the BBF 131 is set according to the code length and the coding rate, as illustrated in FIG. 5. The BBF generation unit 32 generates the BBF 131 with the frame length set according to the code length and the coding rate.

That is, as illustrated on the left side of FIG. 5, the frame length of the BBF 131 is indicated by K_bch. In a table on the right side of FIG. 5, a coding rate (LDPC coding rate) at the time of Low Density Parity-check Code (LDPC) coding of the BBP, an input code length $N_{ldpc}$ [bits], a code length $K_{bch}$ [bits] after the coding, and a data length $K_{bch}$ [B] obtained by converting the code length after the coding into units of bytes are shown from the left side. The coding rate of the LDPC is in the range of 6/15 to 13/15 from the top in the drawing and the code length $K_{ldpc}$ [bits] is 64800 and 16200 bits from the top. Here, the code length after the coding is considered to be the frame length of the BBF 131.

Here, a relation between the input code length $N_{ldpc}$ and the code length $K_{bch}$ after the coding is a relation illustrated in the bottom left of FIG. 5. That is, as illustrated in the bottom left of FIG. 5, the input code length $N_{ldpc}$ is configured to include a BBFRAME (=the code length $K_{bch}$), a BCHFEC (a so-called forward error correction (FEC) code (ECC) of an external code), and an LDPCFEC (a so-called FEC of an internal code). Accordingly, when the input code length $N_{ldpc}$ is encoded according to the coding rate, a code length $K_{ldpc}$ including the BCHFEC is obtained. The frame length $K_{bch}$ (=BBFRAME) of the BBF 131 illustrated on the right side of FIG. 5 is a value obtained by subtracting the value of the BCHFEC from the code length $K_{ldpc}$ after the coding which includes the BCHFEC. The BCHFEC is specified by the input code length $N_{ldpc}$. For example, when the input code length $N_{ldpc}$ is 64800, the BCHFEC is 192 bits. When the input code length $N_{ldpc}$ is 16200, the BCHFEC is 168 bits.

Accordingly, for example, as indicated in a horizontally long thick line of the drawing, the input data length $K_{ldpc}$ is 64800 [bits] and the LDPC coding rate is 10/15, the data length $K_{bch}$ after the coding is 43008 (=64800×10/15−192) [bits] and 5376 [B].

That is, numerical values in the range of a vertically long thick line of the rightmost column on the right side of FIG. 5 are considered to be frame lengths. The maximum frame length of the BBF in the table of FIG. 5 is 6996 [B]. Therefore, in the header (BBH) 141 of the BBF 131, an address of at least 13 bits is necessary.

In this way, in the BBF 131, the frame length is specified by the code length and the coding rate. Therefore, as illustrated in the third stage from the top of FIG. 4, after the headers 141 are stored in the beginning, the BBPs 121 are sequentially stored by a frame length in the BBF payloads 142. As a result, in the BBF 131-1, when the header 141-1 is stored at a beginning position, the BBP 111-1 is stored immediately after the header 141-1, as illustrated in the third stage from the top of FIG. 4. Further, the BBP 111-2 is stored at the rear of the BBP 111-1. However, since the entire BBP 111-2 may not be stored, a header 121-2 and one part 122-2-1 of the BBP payload 122-2 are stored as parts.

Further, in the subsequent BBF 131-2, immediately after a header 141-2 is stored at the beginning position, the other part 122-2-2 of the BBP payload 122-2 is stored and the BBP 111-3 is stored thereafter. The header (BBH) 141 is configured with 2 bytes and stores information regarding a pointer indicating the beginning position of the BBP stored in the BBF 131. Therefore, the BBP 111-2 can be restored by linking the header 121-2 of the BBF 131-1, the BBP payload 122-2-1, and the BBP payload 122-2-2 stored immediately after the header 141-2 of the BBF 131-2. Since the beginning position at which the header 121-3 of the BBP 111-3 is stored can be confirmed by the pointer based on information regarding the header 141-2, the BBP 111-3 stored at the beginning can be appropriately read.

<Specific Configuration Example of Header of BBP in Variable Length Mode>

Next, a specific configuration example of the header 121 of the BBP 111 in the variable length mode will be described with reference to FIG. 6. Here, an IP packet configuring the input packet 101 is an Internet Protocol version 4 (IPv4)/User Datagram Protocol (UDP) packet and a packet length is assumed to be 1500 B. The input packet is assumed to be converted into one BBP without fragmentation and it is assumed that no additional header or the like is added either.

Figure 6:
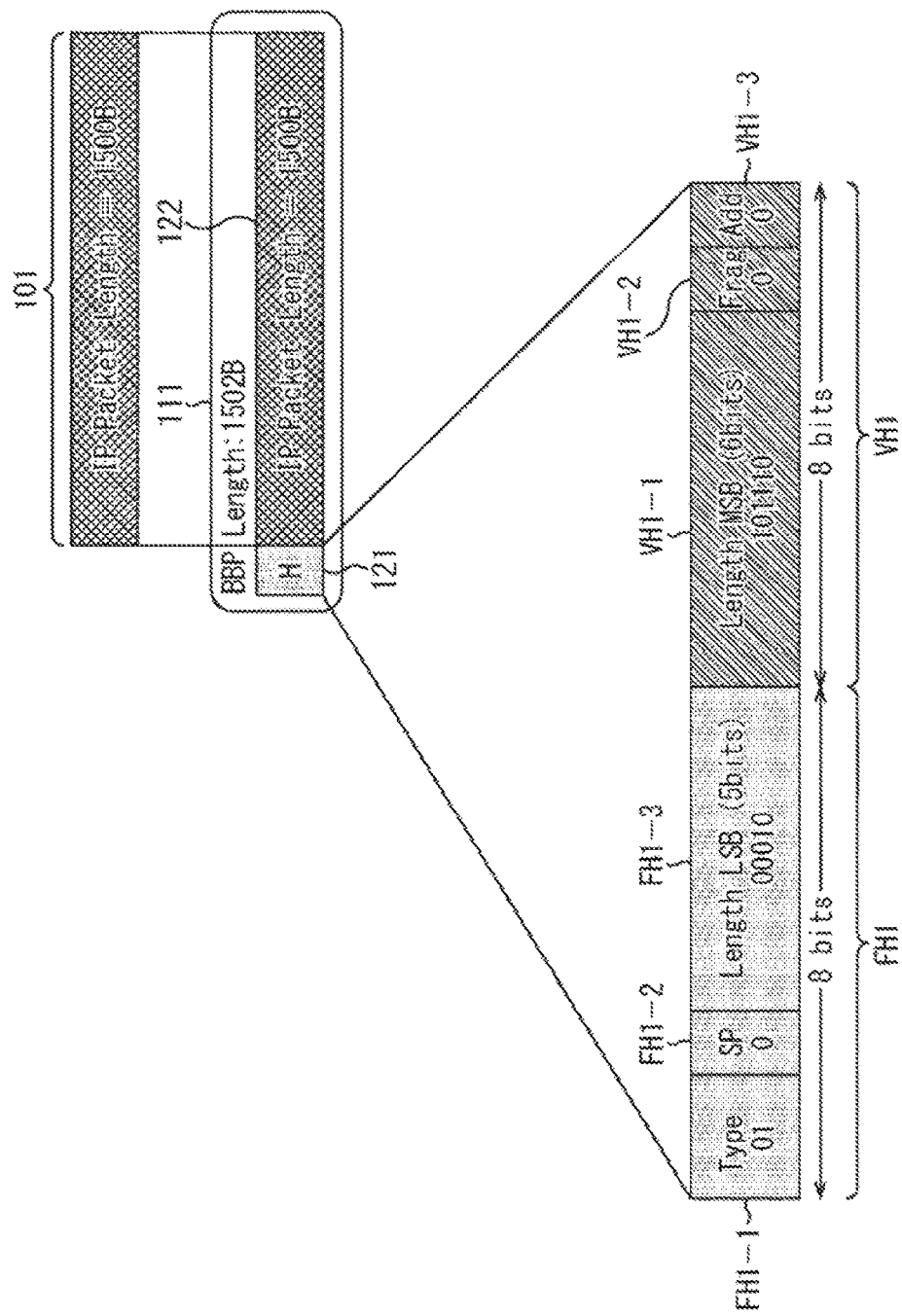
FIG. 6 is an explanatory diagram illustrating a specific configuration example of the header of the BBP.

That is, as illustrated in the uppermost stage of FIG. 6, the input packet 101 has 1500 B. Therefore, since at least 6 bits are necessary, the packet length may not be expressed with only 5 bits of the packet length portion FH1-3 of the minimum fixed length header FH1. In contrast, when 6 bits of the packet length portion VH1-1 in the variable length header VH1 are added, the expression is possible with 11 bits, and thus the expression is possible up to 2048 bytes. Since the input packet is assumed not to be fragmented, the header 121 is in the variable length mode and is configured with 2 bytes of the minimum fixed length header FH1 and the variable length header VH1. Here, the packet length of the BBP is 1502 (=1500+2) bytes, as illustrated in the second stage from the top of FIG. 6.

Further, since the input packet 121 is the IPv4/UDP packet, the minimum packet length of the IP packet is 20 bytes and the minimum packet length of the UDP is 8 bytes, and thus the minimum packet length of the input packet is 28 bytes. Accordingly, when the packet length of the BBP 131 is expressed, 28 bytes necessarily occur. Therefore, information for identifying the packet length is not necessary. Accordingly, in regard to 11 bits formed of 5 bits of the packet length portion FH1-3 and 6 bits of the packet length portion VH1-1, the packet length is expressed with 1474 bytes obtained by subtracting 28 bytes which is the minimum packet length from 1502 bytes which is the packet length of the BBP. Accordingly, when decimal 1474 is expressed in binary, "10111000010" is obtained.

Based on the foregoing information, the header 121 is in the variable length mode, and thus is configured to include the minimum fixed length header FH1 and the variable length header VH1 illustrated in the lowermost stage of FIG. 6. The type identification portion (Type) FH1-1 of the minimum fixed length header FH1 in FIG. 6 stores "01" indicating IPv4 and the mode identification unit (SP) FH1-2 indicating whether the mode is the short packet mode stores "0" indicating that the mode is not the short packet mode. The packet length portion (Length MSB) FH1-3 stores "00010" as 5 low-order bits expressing the input packet length. Further, the packet length portion (Length MSB) VH1-1 of the variable length header VH1 stores "101110" as 6 high-order bits expressing the input packet length. The frag portion (Frag) VH1-2 stores "0" indicating that the mode is not the fragmentation mode and the additional header identification portion (Add) VH1-3 stores "0" indicating that there is no additional header.

<Configuration Example of BBF Formed of BBP in Short Packet Mode>

Next, a configuration example of the BBF formed of the BBP in the short packet mode will be described with reference to FIG. 7.

Figure 7:
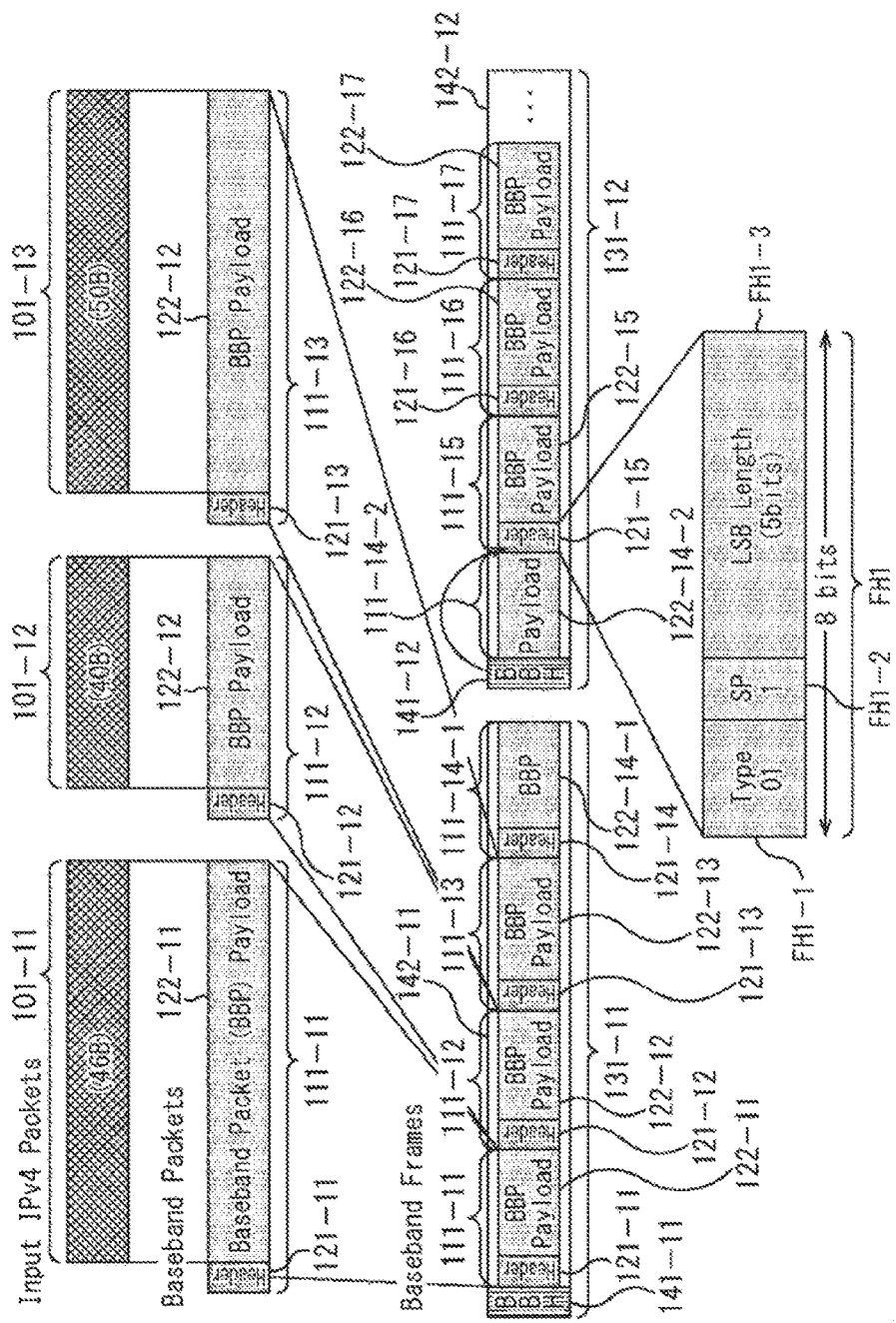
FIG. 7 is an explanatory diagram illustrating a configuration example of the BBP and the BBF in a short packet mode.

As illustrated in the uppermost stage of FIG. 7, input packets (Input IPv4 Packets) 101-11 to 101-13 are assumed to be input. Here, the input packets 101-11 to 101-13 are assumed to have, for example, 46 bytes (B), 40 bytes (B), and 50 bytes (B), respectively.

In this case, as illustrated in the second stage from the top of FIG. 7, the BBP generation unit 31 generates BBPs 111-11 to 111-13 in which headers 121-11 to 121-13 are provided and BBP (Payload) payloads 122-11 to 122-13 are added in regard to the input packets 101-11 to 101-13. Here, the BBP payloads 122 are the input packets 101.

The header 121 has a configuration illustrated in the lowermost stage of FIG. 7. Here, both of the header 121 in the second stage from the top and the header 121 in the third stage from the top have the same configuration.

That is, the header 121 is in the short packet mode, and thus is configured of only the minimum fixed length header FH1. More specifically, 01, 1, and the information regarding the 5-bit packet length of the input packet are stored in the type identification portion (Type) FH1-1, the mode identification portion (SP) FH-2, and the packet length portion (LSB Length) FH-3 of the minimum fixed length header FH1, respectively. That is, the minimum fixed length header FH1 in FIG. 7 indicates that the input packet is an IPv4 packet and the mode is the short packet mode, and thus the information regarding the 5-bit packet length is stored.

The BBF generation unit 32 converts the BBPs illustrated in the second stage from the top of FIG. 7 into the BBFs 131-11 and 121-12 illustrated in the third stage from the top of FIG. 7.

That is, the BBFs 131-11 and 121-12 are configured to include headers (BBH) 141-11 and 141-12 and BBF payloads 142-11 and 142-12, respectively. The frame length of the BBF 131 is specified by a code length and a coding rate, as described with reference to FIG. 5.

In this way, in the BBF 131, the frame length is set by the code length and the coding rate. Therefore, as illustrated in the third stage from the top of FIG. 7, the BBPs 121 are sequentially stored from the beginning by a frame length in the BBF payloads 142. As a result, in the BBF 131-11, when the header 141-11 is stored at a beginning position, the BBPs 111-11 to 111-13 are stored immediately after the header 141-11, as illustrated in the third stage from the top of FIG. 7. However, since the entire BBP 111-14 may not be stored, a header 121-14-14 of the BBP 111-14-1 which is a part of the BBP 111-14 and a BBP payload 122-14-1 which is a part of a BBP payload 122-14 are stored. Further, in the BBF 131-12, immediately after the header 141-12 is stored at a beginning position, the other part 122-14-2 of the BBP payload 122-14 of a BBP 111-14-2 which is a part of the BBP 111-14 is stored and the BBP 111-15 is stored at the rear of the other part 122-14-2. The header (BBH) 141 is configured with 2 bytes and stores information regarding a pointer indicating the beginning position of the stored BBP. Therefore, the BBP 111-14 can be restored by linking the header 121-14 of the BBF 131-11, the BBP payload 122-14-1, and the BBP payload 122-14-2 stored immediately after the header 141-12 of the BBF 131-2. Since the beginning position at which the header 121-15 of the BBP 111-15 is stored can be confirmed by the pointer based on information regarding the header 141-12, the BBP 111-15 stored at the beginning can be appropriately read.

<Specific Configuration Example of Header of BBP in Short Packet Mode>

Next, a specific configuration example of the header 121 of the BBP 111 in the short packet mode will be described with reference to FIG. 8. Here, an IP packet configuring the input packet 101 is an Internet Protocol version 4 (IPv4)/User Datagram Protocol (UDP) packet and a packet length is assumed to be 36 bytes.

Figure 8:
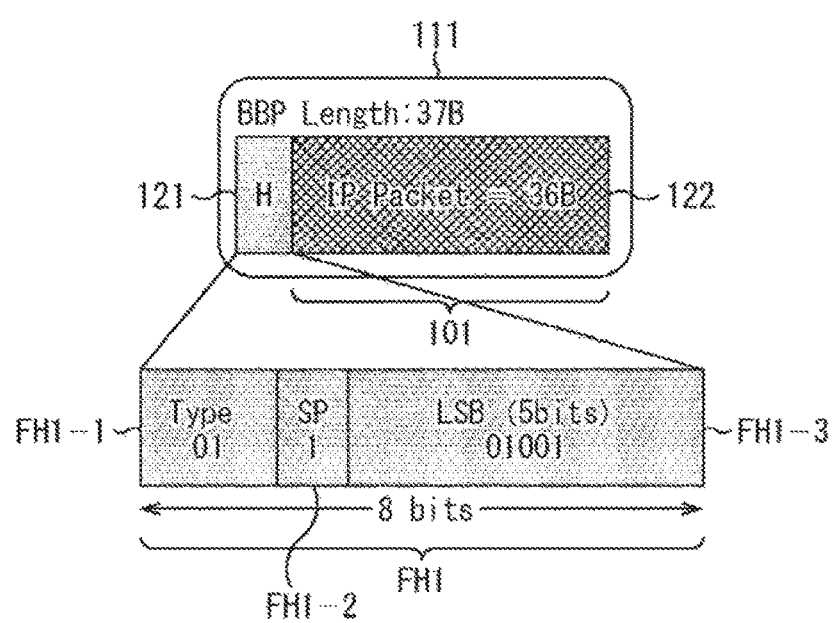
FIG. 8 is an explanatory diagram illustrating a configuration example of the header of the BBP in the short packet mode.

That is, as illustrated in the uppermost stage of FIG. 8, the input packet 101 has 36 bytes. Therefore, at least 6 bits are necessary. However, as described above, 28 B which is the minimum packet length can be offset in the information regarding the packet length. Therefore, 1 byte of the header 121 is added, a sum of the packet length is 9 bytes, and thus can be expressed with 5 bits of the packet length portion FH1-3. More specifically, when decimal 9 is expressed in binary, 01001 is obtained.

Based on the foregoing information, the header 121 is in the short packet mode, and thus is configured to include only the minimum fixed length header FH1 illustrated in the lowermost stage of FIG. 8. The type identification portion (Type) FH1-1 of the minimum fixed length header FH1 in FIG. 8 stores "01" indicating IPv4 and the mode identification unit (SP) FH1-2 indicating whether the mode is the short packet mode stores "1" indicating that the mode is the short packet mode. The packet length portion (MSB) FH1-3 stores "01001" as 5 bits expressing the input packet length.

As described above, the input packet is the IPv4/UDP packet. Therefore, although the example in which 28 B is offset as the minimum packet length has been described, the minimum packet length may be offset according to the type of input packet. For example, when the input packet is an IPv6/UDP packet, the minimum IP packet length is 40 bytes and the minimum UDP packet length is 8 bytes. Thus, in this case, the input packet length can be expressed with a value obtained by offsetting the minimum packet length of 48 bytes by 5 bits of the packet length portion FH1-3.

<Configuration Example of Header of BBP in Additional Variable Length Mode>

Next, a specific configuration example of the header 121 of the BBP 111 in the additional variable length mode will be described with reference to FIG. 9. Here, an IP packet configuring the input packet 101 is an Internet Protocol version 4 (IPv4)/User Datagram Protocol (UDP) packet and a packet length is assumed to be 65533 B. The mode is assumed not to be the fragmentation mode and the input packet is assumed to be converted into one BBP without fragmentation.

Figure 9:
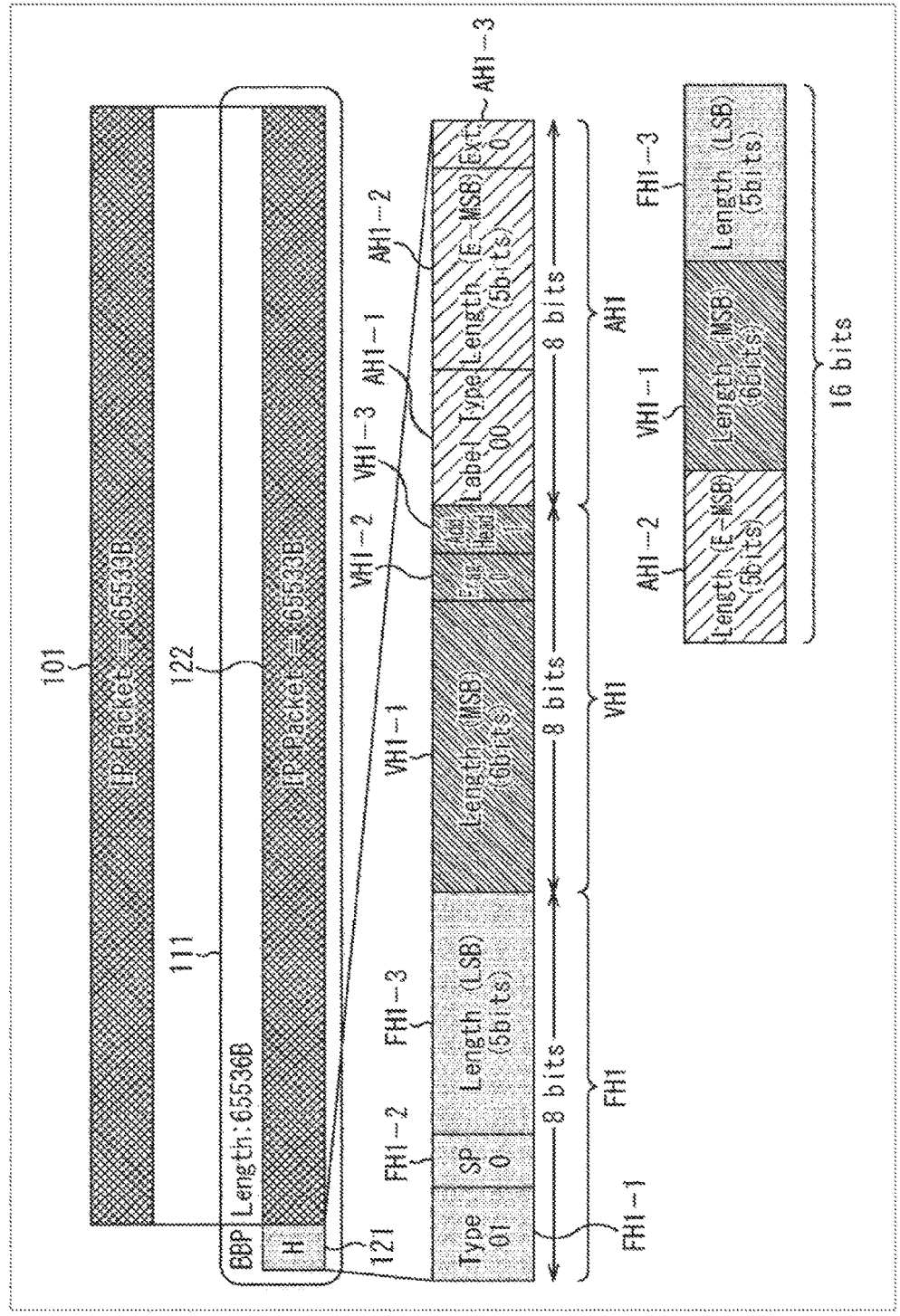
FIG. 9 is an explanatory diagram illustrating a configuration example of the header of the BBP in a fragmentation mode.

That is, as illustrated in the uppermost stage of FIG. 9, since the input packet 101 has 65533 B, at least 16 bits are necessary for the packet length. Therefore, the packet length is insufficient as 11 bits including 5 bits of the packet length portion FH1-3 of the minimum fixed length header FH1 and 6 bits of the packet length portion VH1-1 of the variable length header VH1. Accordingly, 5 bits of the packet length portion AH-2 of the additional header AH1 are necessary. Therefore, the additional header identification portion VH1-3 of the variable length header VH1 stores "1" indicating that there is the additional header AH1.

As illustrated in the lowermost stage of FIG. 9, the packet length is expressed with a sum of 16 bits including 5 bits of the packet length portion FH1-3 of the minimum fixed length header FH1, 6 bits of the packet length portion VH1-1 of the variable length header VH1, and 5 bits of the packet length portion AH-2 of the additional header AH1. Accordingly, the packet length of up to 65536 can be expressed. However, as illustrated in the third stage from the top of FIG. 9, 1 byte of each of the minimum fixed length header FH1, the variable length header VH1, and the additional header AH1 is included in the packet length. Accordingly, 3 bytes are necessary for only the header 121 included in the BBP 111. As a result, as illustrated in the uppermost stage of FIG.

9, the maximum packet length expressible as the input packet is 65533 B. As illustrated in the second stage from the top of FIG. 9, a sum of the header 121 and the BBP payload 122 of the BBP 111 can be expressed up to 65536 B.

Based on the foregoing information, the header 121 is in the additional variable length mode, and thus is configured to include the minimum fixed length header FH1, the variable length header VH1, and the additional header AH1, as illustrated in the third stage from the top of FIG. 9. The type identification portion (Type) FH1-1 of the minimum fixed length header FH1 in FIG. 9 stores "01" indicating IPv4, and the mode identification portion (SP) FH1-2 indicating whether the mode is the short packet mode stores "0" indicating that the mode is not the short packet mode. The packet length portion (Length LSB) FH1-3 stores 5 least significant bits expressing the input packet length.

The packet length portion (Length MSB) VH1-1 of the variable length header VH1 stores 6 higher-order bits than the 5 least significant bits expressing the input packet length. The frag portion (Frag) VH1-2 stores "0" indicating that the mode is not the fragmentation mode and the additional header identification portion (Add Head.) VH1-3 stores "1" indicating that there is the additional header.

Further, the label type portion AH1-1 of the additional header AH1 stores "00" indicating that no label is added. The packet length portion (Length (E-MSB)) AH1-2 stores 5 most significant bits expressing the input packet length. The extension header identification portion (Ext.) AH1-3 stores "0" indicating that there is no extension header AH2.

As described above, in the additional variable length mode, the header 121 of the BBP 111 can be set with a sum of 3 bytes, and thus it is possible to suppress the redundancy. For example, for Generic Stream Encapsulation (GSE), Type Length Value (TLV), or the like, 4 bytes are set in the header. Since the header according to the present technology can be set to be smaller than such a header, it is possible to suppress the redundancy.

<Configuration Example of Header of BBP when Fragmentation Mode is Used as Variable Length Mode>

Next, a configuration example of the header 121 of the BBP 111 when the fragmentation mode is used as the variable length mode will be described with reference to FIG. 10. Here, an IP packet configuring the input packet 101 is an Internet Protocol version 4 (IPv4)/User Datagram Protocol (UDP) packet and a packet length is assumed to be 65440 B.

Figure 10:
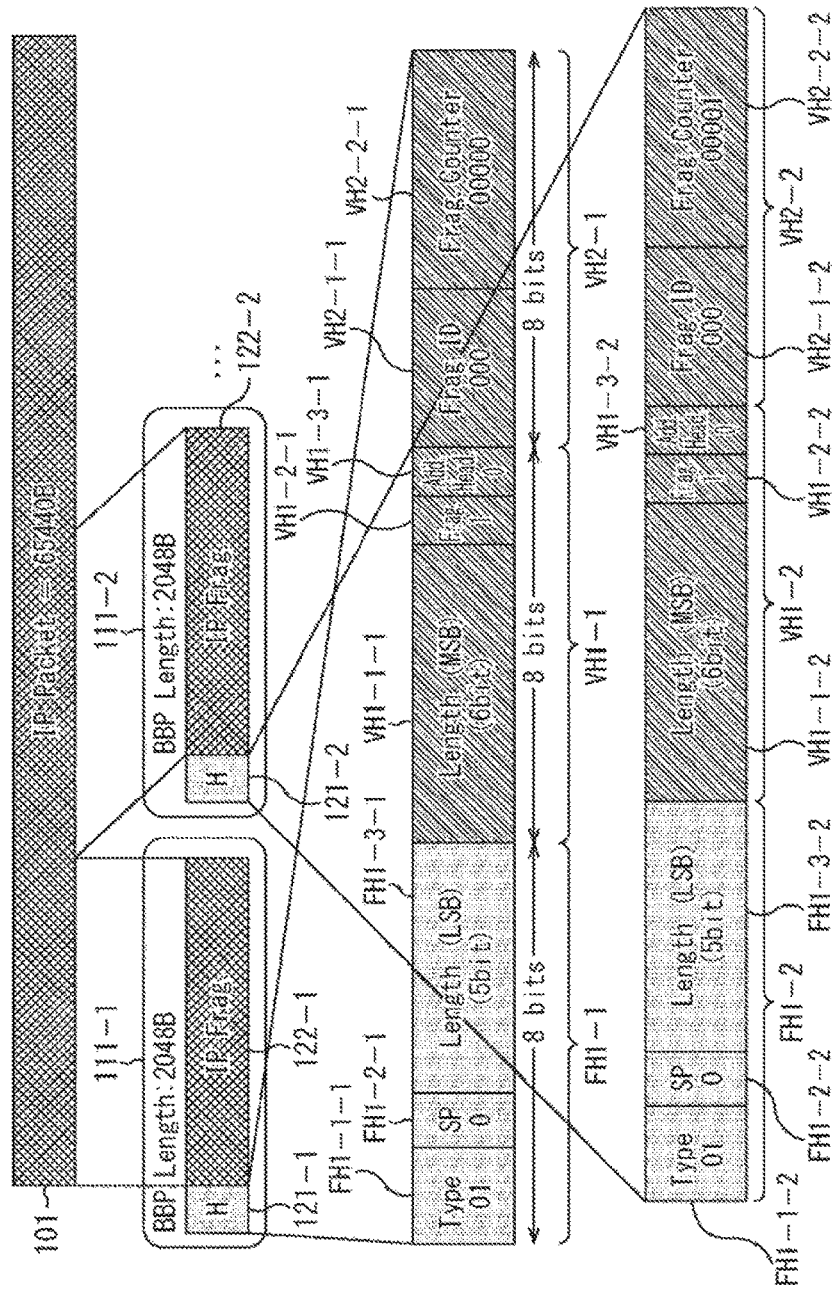
FIG. 10 is an explanatory diagram illustrating a configuration example of the header of the BBP in an additional variable length mode.

That is, as illustrated in the uppermost stage of FIG. 10, the input packet 101 has 65440 bytes (B). The header 121 of the BBP 111 is in the variable length mode and the BBP 111 is in the fragmentation mode. Accordingly, the header 121 is provided with 11 bits to express the packet length of the packet length portion FH1-3 of the minimum fixed length header FH1 and the packet length portion VH1-1 of the variable length header VH1. Accordingly, the maximum packet length of the BBP generated by fragmenting the input packet 101 is 2048 bytes. Here, as illustrated in the lowermost stage and the second stage from the bottom of FIG. 10, the headers 121-1 and 121-2 are configured to include the minimum fixed length header FH1-1, the variable length header VH1-1, and the frag header VH2-1 and the minimum fixed length header FH1-2, the variable length header VH1-2, and the frag header VH2-2, respectively. Therefore, 3 bytes are necessary for both of the headers 121.

Accordingly, the maximum byte unit of the input packet 101 is considered to be 2045 (=2048-3). Therefore, in the case of FIG. 10, as illustrated in the second stage from the top, 32 (=65440/2045) BBPs 111-1 to 111-32 (not illustrated after the BBP 111-3) are generated in regard to the input packet 101. Here, in the BBPs 111-1 to 111-32, the headers 121-1 to 121-32 which each have 3 bytes are added to all of the BBP payloads 122-1 to 122-32 which each have 2045 bytes obtained by fragmenting the input packet into 32 pieces. That is, in the example of FIG. 10, the BBPs 111-1 to 111-32 all have 2048 bytes which is the maximum packet length.

Based on the foregoing information, the header 121-1 is in the variable length mode and the fragmentation mode, and thus is configured to include the minimum fixed length header FH1-1, the variable length header VH1-1, and the frag header VH2-1, as illustrated in the third stage from the top of FIG. 10. The type identification portion (Type) FH1-1-1 of the minimum fixed length header FH1 in FIG. 10 stores "01" indicating IPv4, the mode identification portion (SP) FH1-2-1 indicating whether the mode is the short packet mode stores "0" indicating that the mode is not the short packet mode. The packet length portion (Length (MSB)) FH1-3-1 stores 5 least significant bits expressing the input packet length. Further, the packet length portion (Length (MSB)) VH1-1-1 of the variable length header VH1-1 stores 6 high-order bits expressing the input packet length. The frag portion (Frag) VH1-2-1 stores "1" indicating that the mode is the fragmentation mode and the additional header identification portion (Add) VH1-3-1 stores "0" indicating that there is no additional header AH2. Further, the frag ID portion VH2-1-1 of the additional header AH2-1 stores, for example, "000" as information for identifying the fragmented individual payload because of the beginning. The frag counter portion VH2-2-1 stores, for example, "00000" as a fragmentation number for identifying the fragmented individual payload because of the beginning.

On the other hand, the header 121-2 is illustrated in the lowermost stage of FIG. 10. The headers 121-1 and 121-2 are the same except that the frag counter portion VH2-2-2 is different from the frag counter portion VH2-2-1, and thus the description thereof will be omitted. That is, the frag counter portion VH2-2-2 stores "00001" as a number continued from the BBP 111-1.

As described above, when the fragmentation mode is used, the number of headers increases, and thus an amount of transmission packets increases. However, the input packet 101 with a long packet length can be fragmented to be transmitted. Accordingly, for example, when the packets with higher priority have to be first transmitted, transmission of the input packet 101 with a long packet length is temporarily stopped. Then, the transmission is interrupted, the packets with the high priority are first transmitted, and the fragmented packets are transmitted again.

<Configuration Example of BBF Formed of BBP when Mode is TS Mode and is not Null Packet Deletion Mode>

Next, a configuration example of the BBF formed of the BBP when the mode is the TS mode and is not the null packet deletion mode will be described with reference to FIG. 11.

Figure 11:
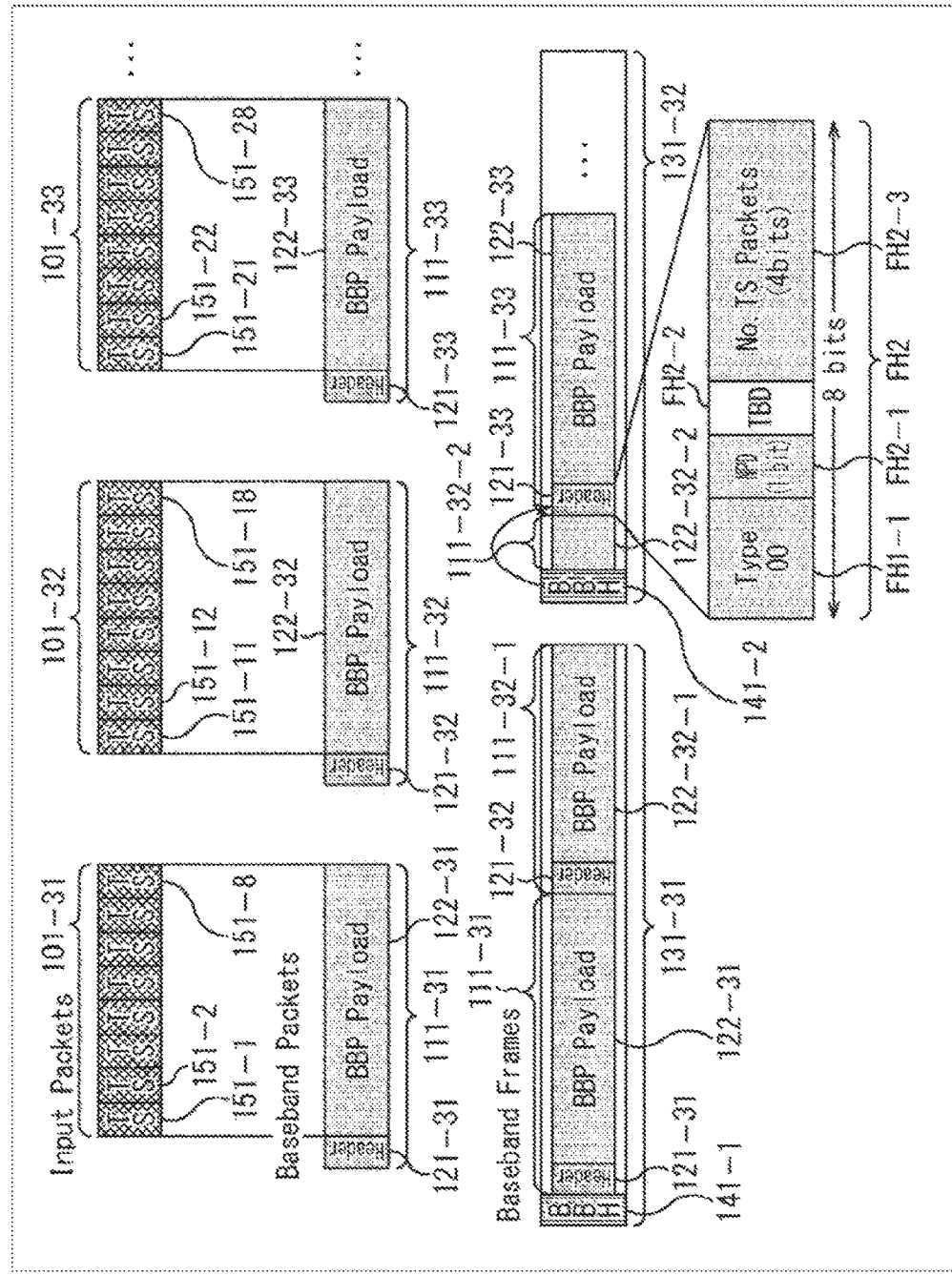
FIG. 11 is an explanatory diagram illustrating a configuration example of the BBP and the BBF when a mode is a TS mode and is not a null packet deletion mode.

As illustrated in the uppermost stage of FIG. 11, input packets 101-31 to 101-33 are assumed to be input. Here, the input packets 101-31 to 101-33 are configured to include TS packets 151-1 to 151-8, TS packets 151-11 to 151-18, and the TS packets 151-21 to 151-28, respectively. That is, the input packets 101 are all configured to include 8 TS packets 151, the packets are considered to be the BBP payloads 122-31 to 122-33, and the BBPs 111-1 to 111-3 are configured.

Incidentally, while a normal TS packet is configured with 188 bytes, the TS packets 151 illustrated in the uppermost stage of FIG. 11 are configured with 187 bytes. As illustrated in the uppermost stage of FIG. 12, the TS packets 151-1 to 151-8 have sync-bytes (0x47) 161-1 to 161-8 of 1 byte to realize synchronization, respectively, and have 188 bytes including the sync-bytes. Accordingly, in the TS packets 151 illustrated in the second stage of FIG. 11 and the uppermost stage of FIG. 12, the BBP payloads 122 in which the sync-byte 161 is deleted are formed. Accordingly, the packet length of the BBP payload 122 is 1496 (=187×8) bytes.

Figure 12:
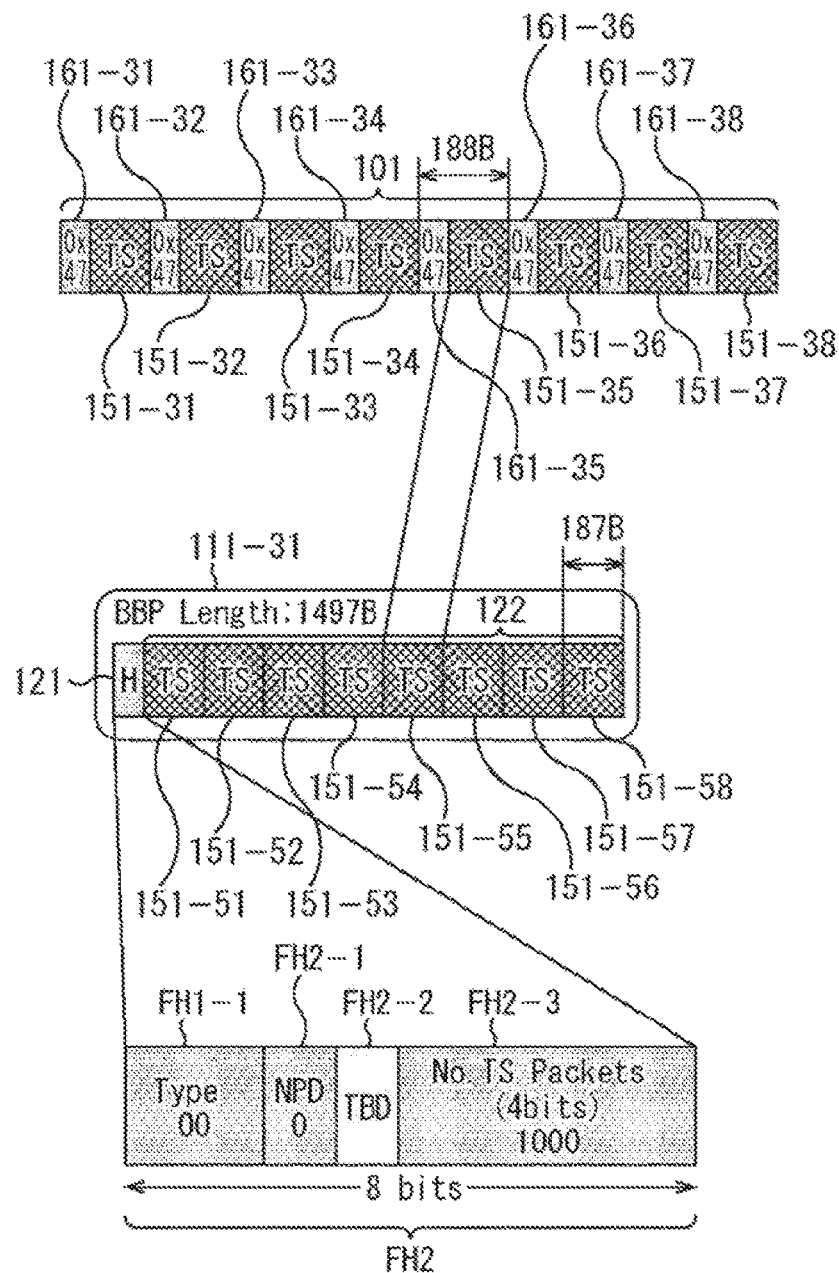
FIG. 12 is an explanatory diagram illustrating a configuration example of the header of the BBP when the mode is the TS mode and is not the null packet deletion mode.

The header 121 has the configuration illustrated in the lowermost stage of FIG. 11 and the lowermost stage of FIG. 12. That is, the header 121 is configured as the 1-byte TS header FH2. More specifically, the type identification portion (Type) FH1-1, the null packet identification portion FH2-1, and the number-of-TS-packets portion FH2-3 of the TS header FH2 store "00," "0," and "1000" corresponding to 8 TS packets as 4 bits of the number of TS packets. That is, the TS header FH2 in FIG. 12 indicates that the input packet is the TS packet, the mode is not the null packet deletion mode, and 8 TS packets are included.

The configuration of the BBFs 131-31 and 131-32 is the same as the BBF 131 described with reference to FIG. 4, and thus the description thereof will be omitted.

In this way, in the TS mode, the sync-bytes are deleted uniformly from the TS packets included in the BBP payloads 122 of the BBPs 111. Therefore, for example, when the number of normal TS packets is 8, 1504 bytes are calculated. However, 1496 bytes can be calculated from 1 byte of the header 121 and 1496 of the BBP payload 122, and 6 bytes can be compressed.

Figure 13:
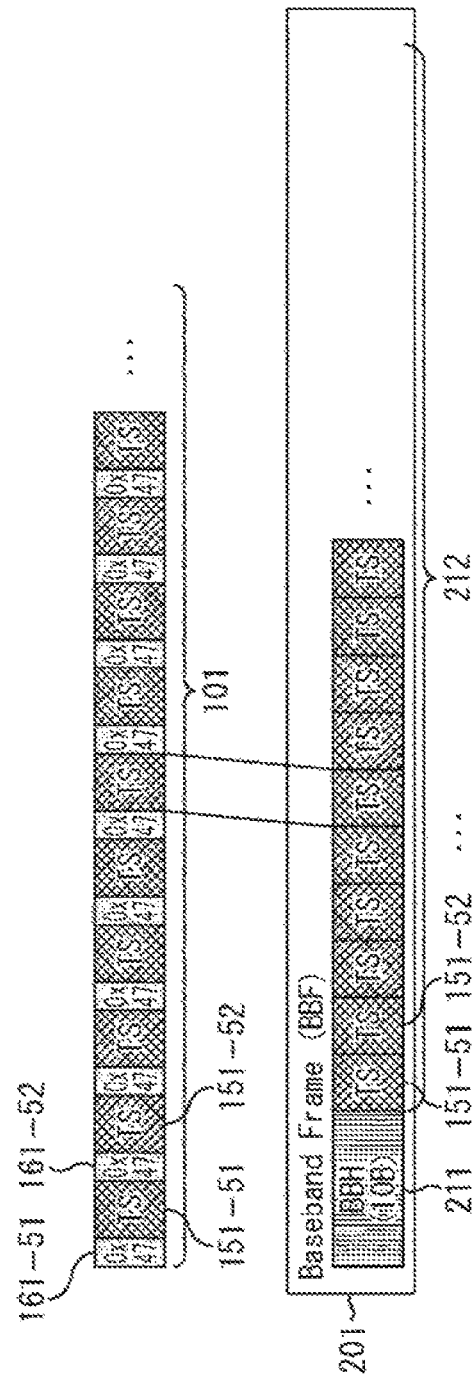
FIG. 13 is an explanatory diagram illustrating a configuration example of the BBF in DVB-T2 when a mode is the TS mode and is not the null packet deletion mode.

For example, in the case of DVB-T2, there is no concept of the BBP in the TS mode. When the TS packets illustrated in the upper stage of FIG. 13 are input, as illustrated in the lower stage of FIG. 13, a header 211 formed of 10 bytes (B) of a BBF 201 is provided and the TS packets are stored in a payload 212, excluding the sync-bytes. Here, presence or absence of the null packet deletion mode to be described below is included in the header 211. Therefore, when transmission of the TS packets starts, packets with higher priority may not be first transmitted.

In contrast, in the TS mode according to the present technology, the BBPs 111 can be configured. Even when the packets with high priority are generated during the transmission of the TS packets, the packets can be preferentially transmitted.

<Configuration Example of BBP when Mode is TS Mode and Null Packet Deletion Mode>

Next, a configuration example of the BBP when the mode is the TS mode and the null packet deletion mode will be described with reference to FIG. 14.

Figure 14:
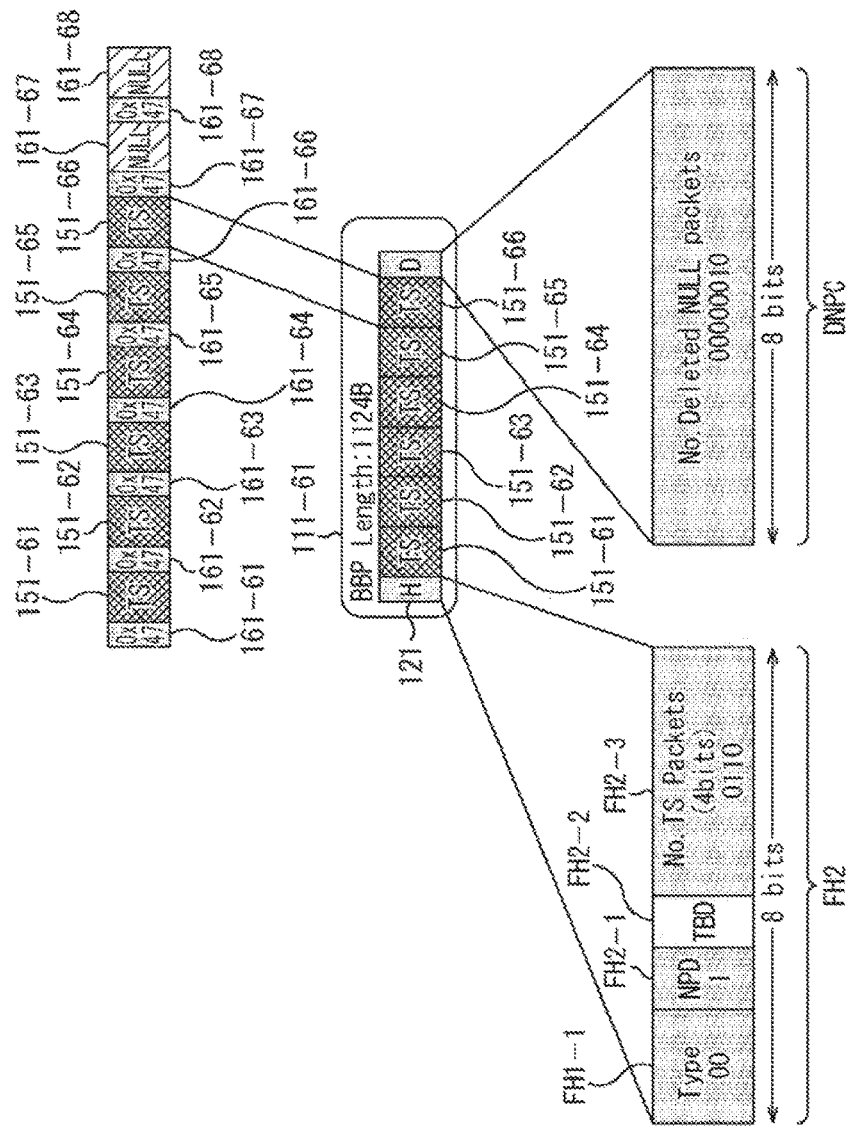
FIG. 14 is an explanatory diagram illustrating a configuration example of the header of the BBP when the mode is the TS mode and is the null packet deletion mode.

As illustrated in the uppermost stage of FIG. 14, an input packet is configured to include TS packets 151-61 to 151-68 and 1-byte sync-bytes 161-61 to 161-68 are provided at the beginning positions of the TS packets. When the TS packets 151-67 and 151-68 of the TS packets are so-called null packets, a BBP 111-61 has a configuration illustrated in the second stage from the top of FIG. 14.

That is, the BBP 111-61 in this case is configured to include a 1-byte TS header FH2, as illustrated in the lower-leftmost stage of FIG. 14. Only the TS packets 151-61 to 151-66 which are not null packets are stored subsequently and the TS packets 151-67 and 151-68 which are null packets are deleted. Further, as illustrated in the lower-rightmost stage of FIG. 14, a 1-byte number-of-deleted-TS-packets portion DNPC (Deleted Null Packet Counter) indicating the number of deleted TS packets is stored.

Even at this time, the TS packets 151 from which the sync-bytes are deleted are stored. Accordingly, in this example, the BBP 111-61 has 1124 (=1+187×6+1) bytes.

As illustrated in the lower-leftmost stage of FIG. 14, the header 121 is configured as the 1-byte TS header FH2. More specifically, the type identification portion (Type) FH1-1, the null packet identification portion FH2-1, and the number-of-TS-packets portion FH2-3 of the TS header FH2 store "00," "1," and "0100" corresponding to 6 TS packets as 4 bits of the number of TS packets. That is, the TS header FH2 in FIG. 14 indicates that the input packet is the TS packet, the mode is the null packet deletion mode, and 6 TS packets are included in the BBP 111-61.

Further, as illustrated in the lower-rightmost stage of FIG. 14, a 1-byte number-of-deleted-TS-packets portion DNPC is set at the rear of the TS packet 151-66. In this example, the two TS packets 151-6 and 151-68 are deleted, "00000010" is registered.

A plurality of TS packets 151 in one BBP 111 can be deleted only when the TS packets of the null packets to be deleted are continuous among the TS packets 151 included in the one BBP 111. Accordingly, in the case of the null packet deletion mode, when the null packets and the TS packets 151 which are not the null packets alternate, the BBP 111 formed of one TS packet 151 is configured and each BBP including the header 121 and the number-of-deleted-TS-packets portion DNPC is configured.

Figure 15:
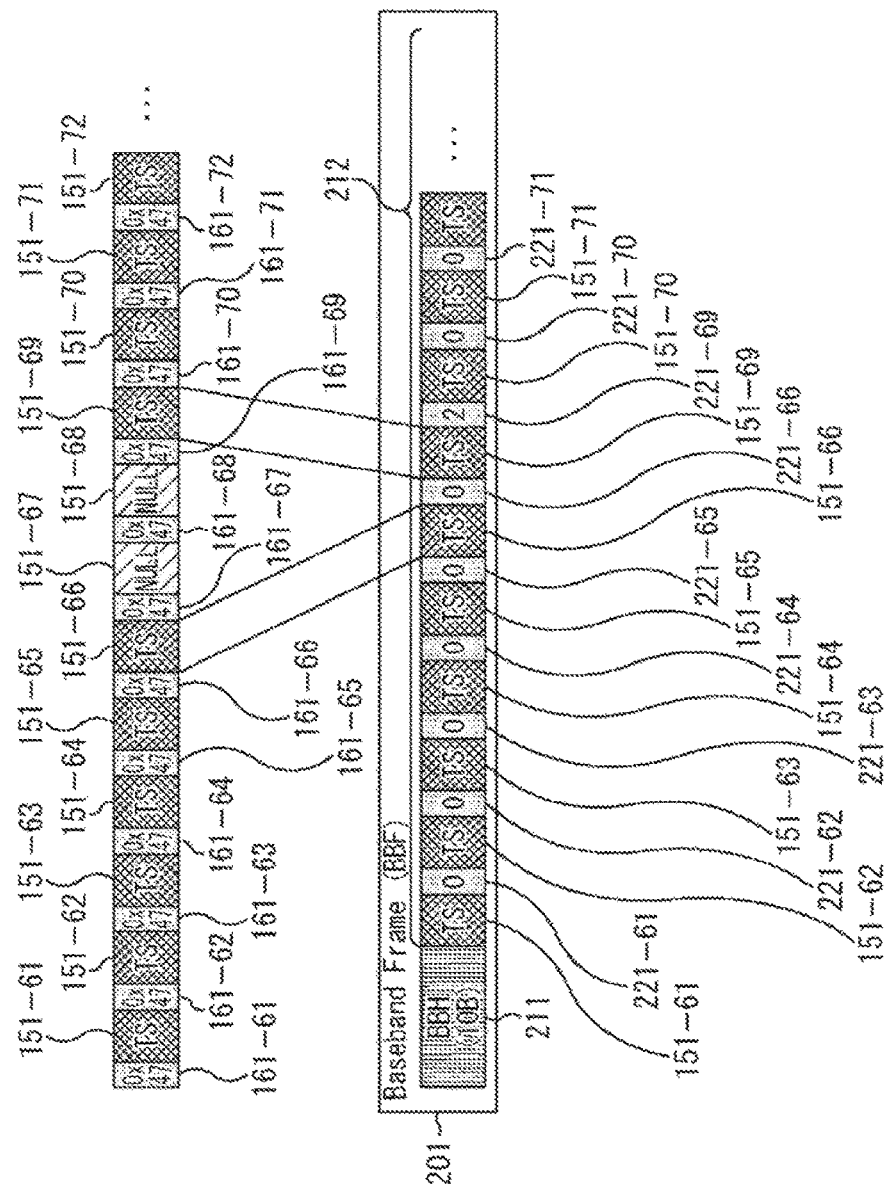
FIG. 15 is an explanatory diagram illustrating a configuration example of the BBF in DVB-T2 when a mode is the TS mode and is the null packet deletion mode.

Incidentally, in the case of DVB-T2, there is also the null packet deletion mode. More specifically, as illustrated in the upper stage of FIG. 15, when TS packets 151-61 to 151-70 are input and the TS packets 151-67 and 151-68 are null packets, a configuration illustrated in the lower stage of FIG. 15 is realized.

That is, for DVB-T2, there is no concept of the BBP in the TS mode, as described above. The BBF 201 is configured and information indicating the null packet deletion mode is stored in the 10-byte header 211. Further, the subsequent payload 212 is configured such that 1-byte number-of-deleted-packets portions 221 are provided at the rears of the TS packets 151. Information indicating that two TS packets are deleted is stored in a number-of-deleted-packets portion 221-69 at the rear of the TS packet 151-69 disposed after the TS packets 151-67 and 151-68 are deleted. Accordingly, regardless of presence or absence of the TS packets to be deleted, the 1-byte number-of-deleted-packets portion 221 is necessarily provided at the rear end of the recorded TS packet 151, and thus information regarding the number of deleted TS packets is registered.

In contrast, in the present technology, the 1-byte number-of-deleted-TS-packets portion DNPC is merely provided in one BBP regardless of the presence or absence of the deletion. Therefore, even when the BBF is configured, it is possible to sufficiently suppress the redundancy. Even when the TS packets are transmitted, the BBP 111 can be configured. Therefore, even when packets with high priority are generated during the transmission of the TS packets, the packets with the high priority can be transmitted preferentially.

<Configuration Example of Header of BBP in Bit Stream Packets>

Next, a configuration example of the header of the BBP when an input packet is a bit stream packet will be described with reference to FIG. 16.

Figure 16:
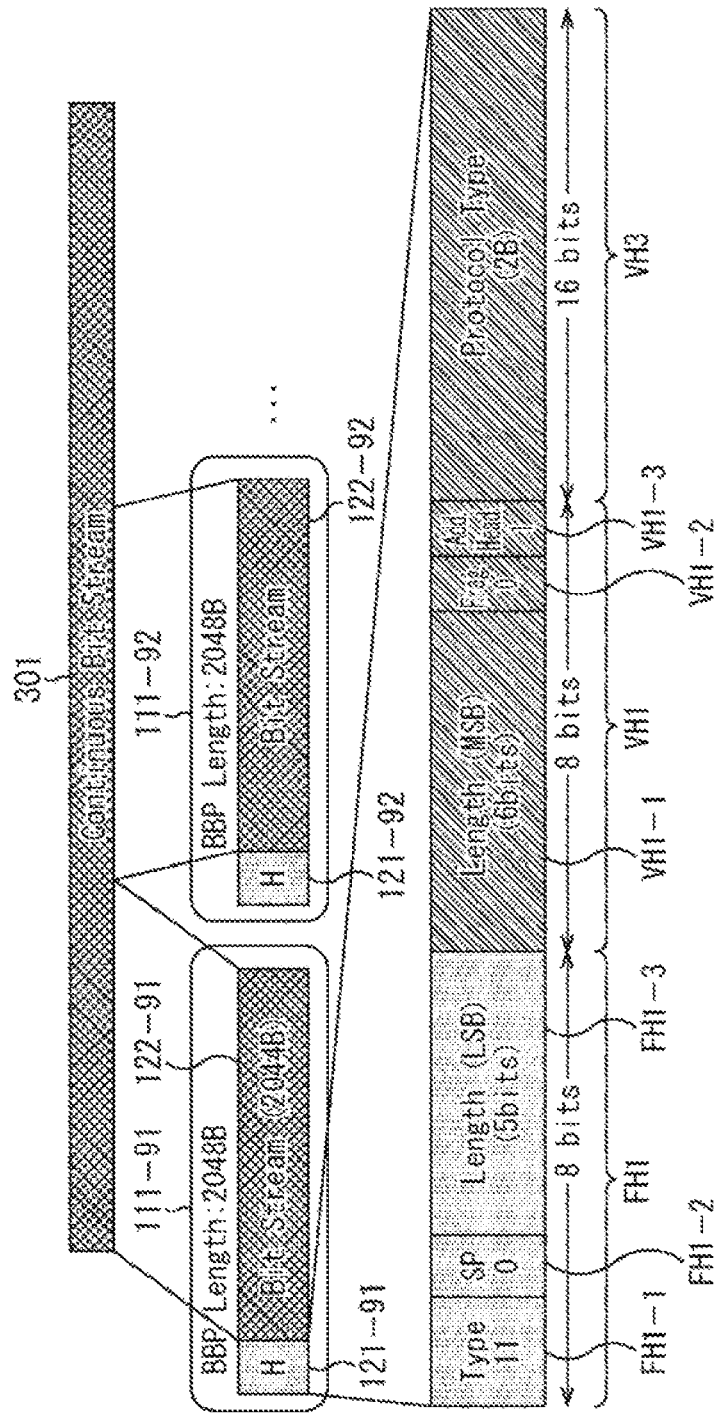
FIG. 16 is an explanatory diagram illustrating a configuration example of the header of the BBP when bit stream packets are transmitted.

As illustrated in the uppermost stage of FIG. 16, a bit stream (Continuous Bit Stream) 301 is assumed to be input as the input packet.

In this case, the BBP generation unit 31 demarcates the bit stream 301 in units of 2044 bytes, as illustrated in the second stage from the top of FIG. 16 to generate BBPs 111-91, 111-92, and the like in which headers 121-91, 121-92, and the like are provided and BBP (Payload) payloads 122-91, 122-92, and the like formed from the bit stream are added. Here, the BBP payloads 122 are formed by demarcating the input bit stream in units of 2044 bytes. Accordingly, since each BBP 111 is configured to include the 4-byte header 121 and the 2044-byte BBP payload 122, the packet length is 2048 bytes which is the maximum packet length.

The header 121 has a configuration illustrated in the lowermost stage of FIG. 16. That is, the header 121 is configured to include a minimum fixed length header FH1, a variable length header VH1, and a protocol type header VH3. More specifically, 11, 0, and a packet length of the input packet are stored in the type identification portion (Type) FH1-1, the mode identification portion (SP) FH-2, and the packet length portion (Length (LSB)) FH-3 of the minimum fixed length header FH1, respectively. That is, the minimum fixed length header FH1 in FIG. 16 indicates that the type of input packet is the other type (other) and the mode is not the short packet mode, and thus 5 low-order bits are stored as information regarding the packet length of 5 bits.

Further, 6 bits of the packet length, 0, and 1 are stored in the packet length portion VH1-1, the frag portion VH1-2, and the additional header identification portion VH1-3 of the variable length header VH1, respectively. That is, the variable length header VH1 in FIG. 16 indicates that 6 high-order bits of the packet length of the BBP payload which is the input packet are stored, the mode is not the fragmentation mode, and there is the additional header. That is, it is indicated that the protocol type header VH3 is present as the additional header.

The information regarding the packet length of the BBP 111 formed with 11 bits is stored by the packet length portions FH1-1 and VH1-1.

Further, the protocol type header VH3 stores information regarding the protocol type of the bit stream which is the input packet formed with 2 bytes (16 bits).

Based on the foregoing information, the header 121 in FIG. 16 is configured to include the minimum fixed length header FH1, the variable length header VH1, and the protocol type header VH3 illustrated in the lowermost stage of FIG. 16. The type identification portion (Type) FH1-1 of the minimum fixed length header FH1 in FIG. 16 stores "11" indicating the other type (other) and the mode identification portion (SP) FH1-2 indicating whether the mode is the short packet mode stores "0" indicating that the mode is not the short packet mode. The packet length portion (Length (MSB)) FH1-3 stores "11111" as 5 low-order bits expressing the input packet length. Further, the packet length portion (Length (MSB)) VH1-1 of the variable length header VH1 stores "111111" as 6 high-order bits expressing the input packet length. That is, in the case of FIG. 16, it is indicated that the packet length of the BBP 111 is 2048 bytes which is the maximum packet length. The frag portion (Frag) VH1-2 stores "0" indicating that the mode is not the fragmentation mode and the additional header identification portion (Add. Head) VH1-3 stores "1" indicating that there is the protocol type header VH3 which is the additional header. The protocol type header VH2 stores information regarding the protocol type of the bit stream stored in the BBP payload 122.

In such a configuration, the BBPs are configured from various types of bit streams to be transmitted or received.

A Robust Header Compression (RoHC) technology has been widely known as a header compression technology for IPv4 or IPv6. RoHC is excellent in compression of IP headers. However, RoHC is not always implemented because it involves a complicated process, has several types, and has lower compression in a U-mode (Unidirectional mode) that is still appropriate for broadcasting than in a bidirectional mode. However, according to the present technology, RoHC can also be supported. That is, as illustrated in FIG. 16 described above, by storing 11 in the type identification portion (Type) FH1-1 of the minimum fixed length header FH1, registering information indicating other, and storing information regarding RoHC in the protocol type header VH3, it is possible to define RoHC as a header. Additionally, various compression schemes can be adopted in accordance with similar techniques.

<Configuration Example of BBH of BBF>

Next, a configuration example of a BBH in a BBF will be described with reference to FIG. 17.

Figure 17:
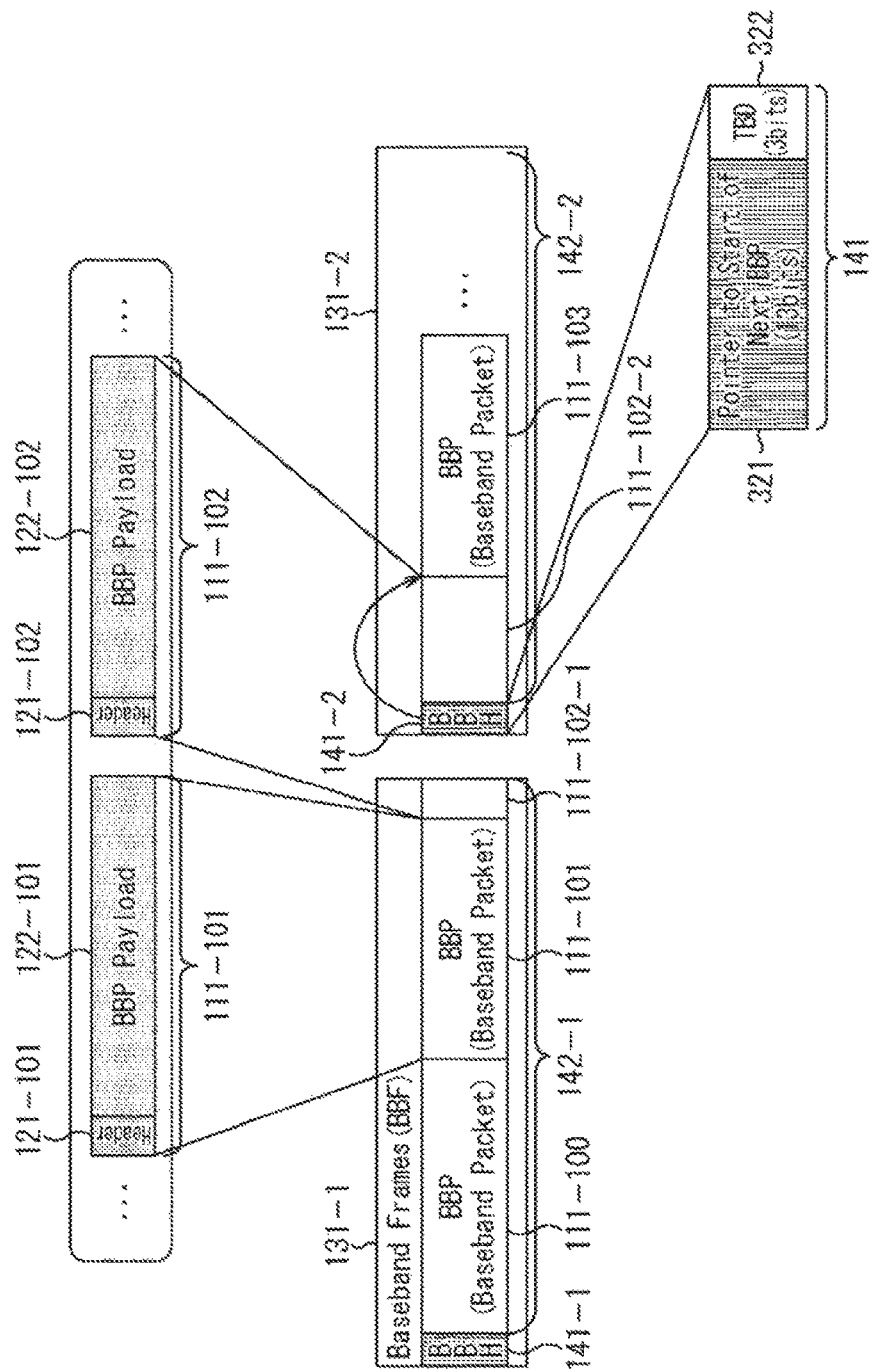
FIG. 17 is an explanatory diagram illustrating a configuration example of a BBH of the BBF.

For example, when BBPs 111-101, 111-102, and the like configured to include headers 121-101, 121-102, and the like and BBP payloads 122-101, 122-102, and the like are input, as illustrated in the uppermost stage of FIG. 17, the BBF generation unit 32 generates BBFs 131-1, 131-2, and the like, as illustrated in the second stage of FIG. 17.

That is, as illustrated in the second stage from the top of FIG. 17, the BBF generation unit 32 configures BBFs 131-1, 131-2, and the like with a data length set according to the packet length and the coding rate of the input packet. More specifically, for example, the BBF generation unit 32 stores a BBH 141-1 at the beginning position of the BBF 131-1 and subsequently stores BBP 111-100, 111-101, and the like in sequence at the rear of the BBH 141-1 to form the BBF having the set data length. At this time, as illustrated in the second stage of FIG. 17, when only a midway part of the BBP 111-102 is stored, the midway part is stored as a BBP 111-102-1, a BBH 141-2 is stored at the beginning of the subsequent BBF 131-2, and the rear part of the BBP 111-102 is stored as a BBP 111-102-2. Then, the BBF generation unit 32 continuously repeats a process of storing the BBPs 111-103 and the like until the BBF 132-2 has the data length.

At this time, the BBF generation unit 32 controls the BBH addition unit 41 such that the BBH 141 having a configuration example illustrated in the lower right of FIG. 17 is stored at the beginning position of each BBF 131. That is, the BBH 141 is configured with 2 bytes (16 bits) and stores information regarding a pointer indicating the start position of the BBP 111 stored from its beginning in its beginning 13-bit pointer storage portion (Pointer to Start of Next BBP) 321 on the BBF 131. That is, in the case of the second stage of FIG. 17, to store the BBP 111-102-2 which is the rear part of the BBP 111-102 which is not storable in the immediately previous BBF 131-1, as indicated by an arrow, the start position of the BBP 111-103 newly stored from its beginning is stored as a pointer in the BBH 141-2. Further, 3 bits of the BBH 141 are set as an empty region (TBD) 322.

Figure 18:
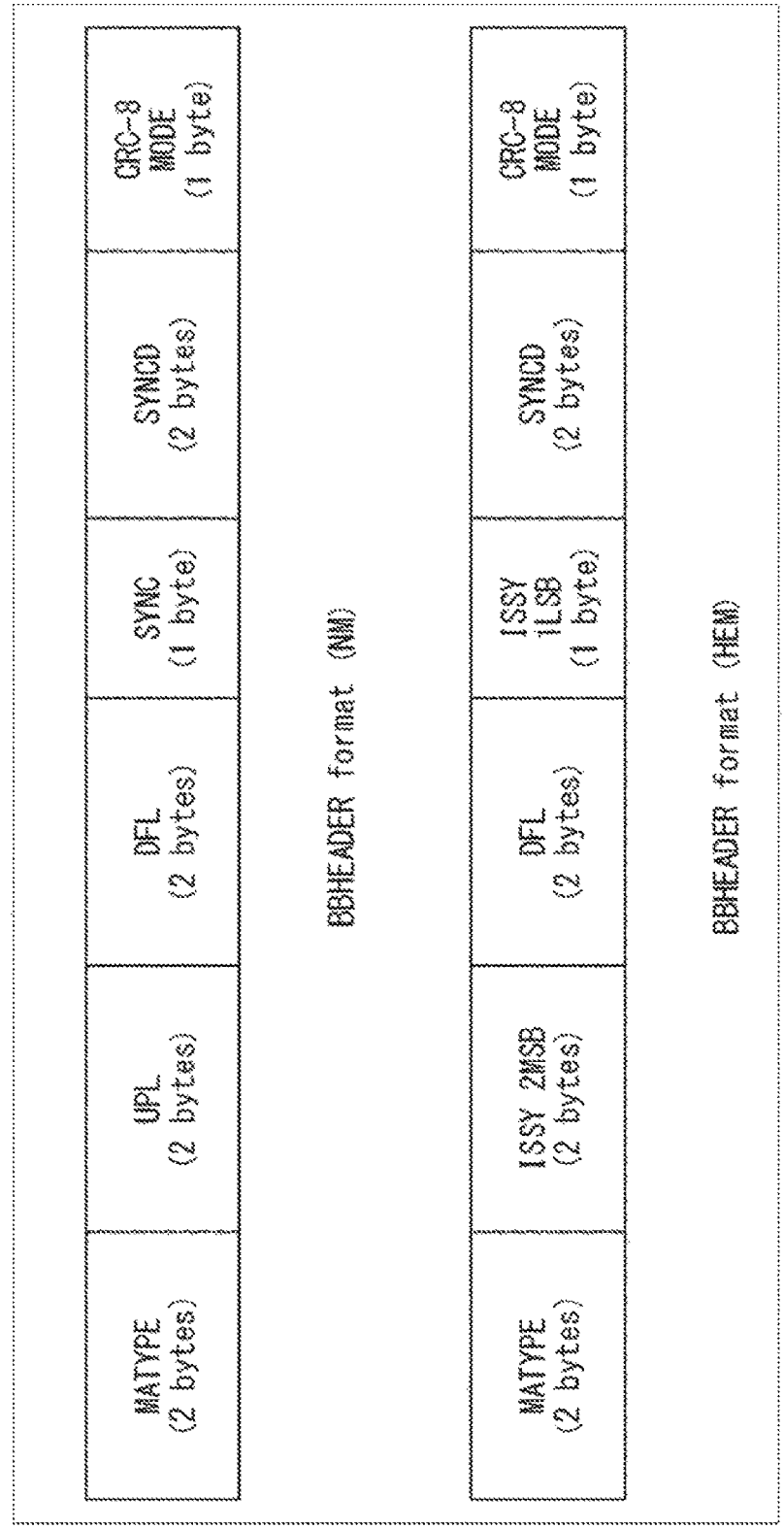
FIG. 18 is an explanatory diagram illustrating a configuration example of a BBH of the BBF in DVB-T2.

Incidentally, a BBH of a BBF in DVB-T2 has a configuration illustrated in FIG. 18. Here, the upper stage of FIG. 18 is a BBH in the case of a normal mode and the lower stage is a BBH in the case of a high efficiency mode.

The BBH in DVB-T2 is configured with 10 bytes in both modes. In the case of the normal mode, the BBH is configured to include MATYPE (2 bytes), UPL (2 bytes), DFL (2 bytes), SYNC (1 byte), SYNCD (2 bytes), and CRC-8 MODE (1 byte). In the case of the high efficiency mode, the BBH is configured to include MATYTE (2 bytes), ISSY 2MSB (2 bytes), DFL (2 bytes), ISSY LSB (1 byte), SYNCD (2 bytes), and CRC-8 MODE (1 byte).

MATYPE indicates an input stream format, User Packet Length (UPL) indicates a user packet length, Data Field Length (DFL) indicates a data length in a data field, and SYNC indicates a so-called sync-byte. SYNCD indicates a distance from the start position of the data field to the start position of data, CRC-8 MODE indicates a mode in CRC-8, and Input Stream Synchronization Indicator (ISSY) LSB and ISSY 2MSB each indicate input stream synchronization detection information.

That is, in DVB-T2, the BBH has a large amount of data and includes various types of data. Therefore, not only is a process complicated, but an amount of circulated data also increases because the data length of the BBH is large.

In contrast, in regard to the BBH according to the present technology, as described above, information to be stored is only a pointer indicating the start position of a BBP stored newly from its beginning for each BBF. Therefore, a process after reception at the time of reading is also easy and an amount of data can be suppressed.

In such a structure, the BBP extraction unit 73 in the reception device 51 extracts the BBPs 111 from the sequentially supplied BBFs 131, the BBP extraction unit 73 may simply extract the BBFs 131 from the beginning positions based on the information regarding the BBHs 141. Therefore, the BBPs 111 can be extracted easily and appropriately. As a result, it is possible to realize packet communication more rapidly and reliably.

<Transmission and Reception Processes by Transmission Device in FIG. 1 and Reception Device in FIG. 2>

Figure 19:
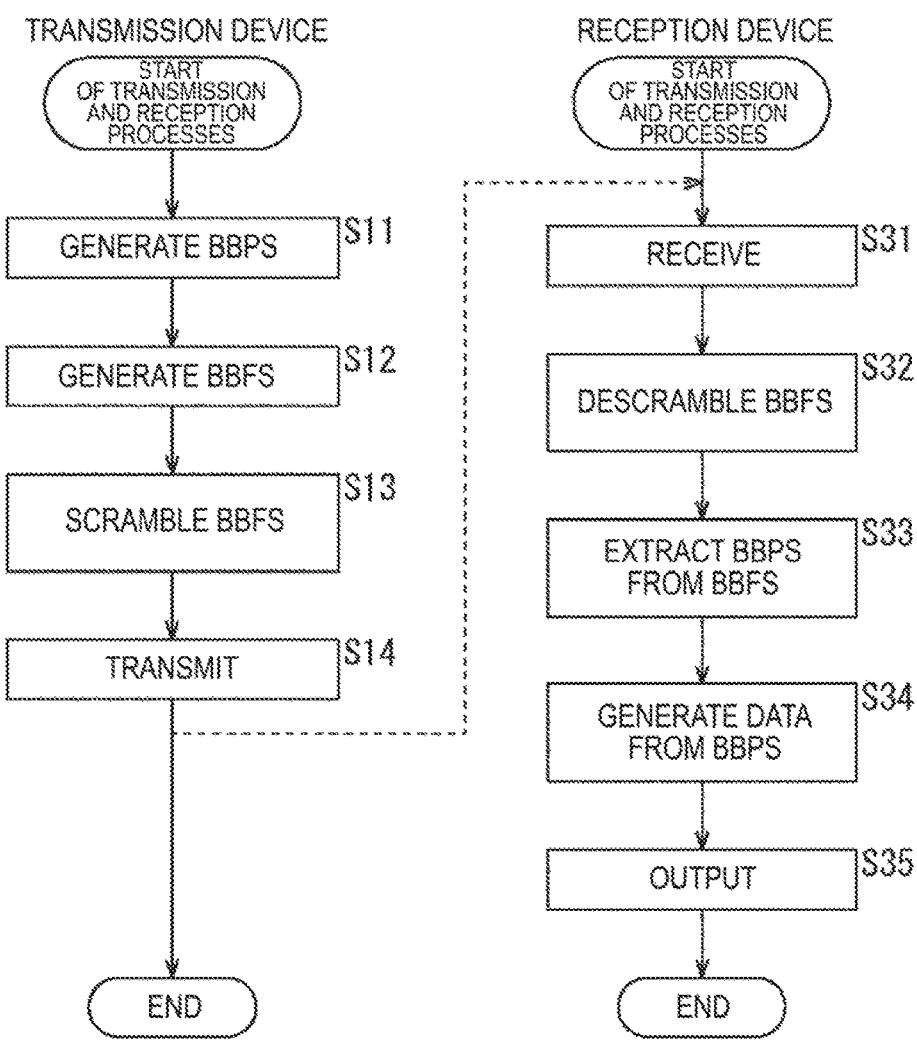
FIG. 19 is a flowchart for describing transmission and reception processes executed by a first transmission device and a first reception device according to the present technology.

Next, transmission and reception processes by the transmission device 11 in FIG. 1 and the reception device 51 in FIG. 2 will be described with reference to the flowchart of FIG. 19.

In step S11, the BBP generation unit 31 generates the BBPs based on the input packets through the above-described processes and supplies the BBPs to the BBF generation unit 32. More specifically, the BBP generation unit 31 identifies the types of input packets. When the input packets are the IP packets, the BBP generation unit 31 generates the BBPs in one of the short packet mode described with reference to FIG. 7, the variable length mode described with reference to FIG. 4, and the additional variable length mode described with reference to FIG. 9 according the packet lengths of the input packets. When the input packets are the TS packets, the BBP generation unit 31 generates the BBPs in the TS packet mode described with reference to FIG. 11 or 14. Further, when the input packets are neither the IP packets nor the TS packets, the BBP generation unit 31 registers the information regarding the type recognized in the protocol header VH3 and generates the BBPs as the BBPs are generated from the bit stream packets described with reference to FIG. 15. The BBP generation unit 31 generates the header according the fragmentation mode or the null packet deletion mode as necessary and generates the BBPs.

In step S12, the BBF generation unit 32 generates the BBF based on the supplied BBPs and supplies the BBF to the BBF scrambler 33. More specifically, the BBF generation unit 32 controls the BBH addition unit 41 such that the BBH addition unit 41 generates information regarding the pointer indicating the start position of the BBP newly stored from its beginning for each BBF in accordance with the above-described technique and stores the information at the beginning position of the BBF. Further, the BBF generation unit 32 generates the BBF by sequentially storing the BBPs in the BBF with the frame length set according to the code length and the coding rate of the input packet, and supplies the BBF to the BBF scrambler 33.

In step S13, the BBF scrambler 33 scrambles the supplied BBF and supplies the BBF to the transmission unit 34.

In step S14, the transmission unit 34 transmits the scrambled BBF to the reception device 51.

In step S31, the reception unit 71 of the reception device 51 receives the BBF transmitted from the transmission device 11 and supplies the BBF to the BBF descrambler 72.

In step S32, the BBF descrambler 72 descrambles the supplied scrambled BBF and supplies the descrambled BBF to the BBP extraction unit 73.

In step S33, the BBP extraction unit 73 sequentially extracts the BBPs from the descrambled BBF. More specifically, the BBP extraction unit 73 controls the BBH recognition unit 73a such that the BBH recognition unit 73a recognizes the information regarding the pointer recorded in the BBH in the BBF and indicating the start positions of the BBPs newly stored from its beginning for each BBF, sequentially extracts the BBPs in the BBF, and supplies the BBPs to the data generation unit 74.

In step S34, the data generation unit 74 generates the input packet input to the transmission device 11 from the BBPs supplied from the BBP extraction unit 73.

In step S35, the data generation unit 74 outputs the generated input packet.

Through the foregoing processes, the input packet is converted into the above-described BBPs, the BBF is generated based on the converted BBPs, the BBF is transmitted, the BBPs are generated based on the received BBF, and the input packet is generated from the BBPs. As a result, it is possible to suppress the redundancy of the transmitted and received packets and it is possible to realize the packet communication rapidly and reliably.

<2. Second Embodiment>
<Example in which NRT Data is Inserted into Null Packet>

Incidentally, a bandwidth of a physical layer (PHY) generally used for broadcasting is a fixed bit rate. That is, normal digital broadcasting signals are decided to be transmitted from transmission devices to reception devices within constant delay times in accordance with buffer models. In order to realize this, encoding of a broadcasting signal formed of a video and audio is controlled so that quality (mainly, image quality) of each program is optimized in a range in which a generated code amount of data of a plurality of programs with variable length bit rates do not exceed a fixed bit rate of the physical layer.

At this time, a null packet is inserted into portions in which a code amount is insufficient for the fixed bit rate to be adjusted to the fixed bit rate.

In the physical layer, a generated code amount decreases according to the header compression technology or the variable length header technology described above. However, when the code amount is insufficient for the fixed bit rate, a null packet may be inserted.

Figure 20:
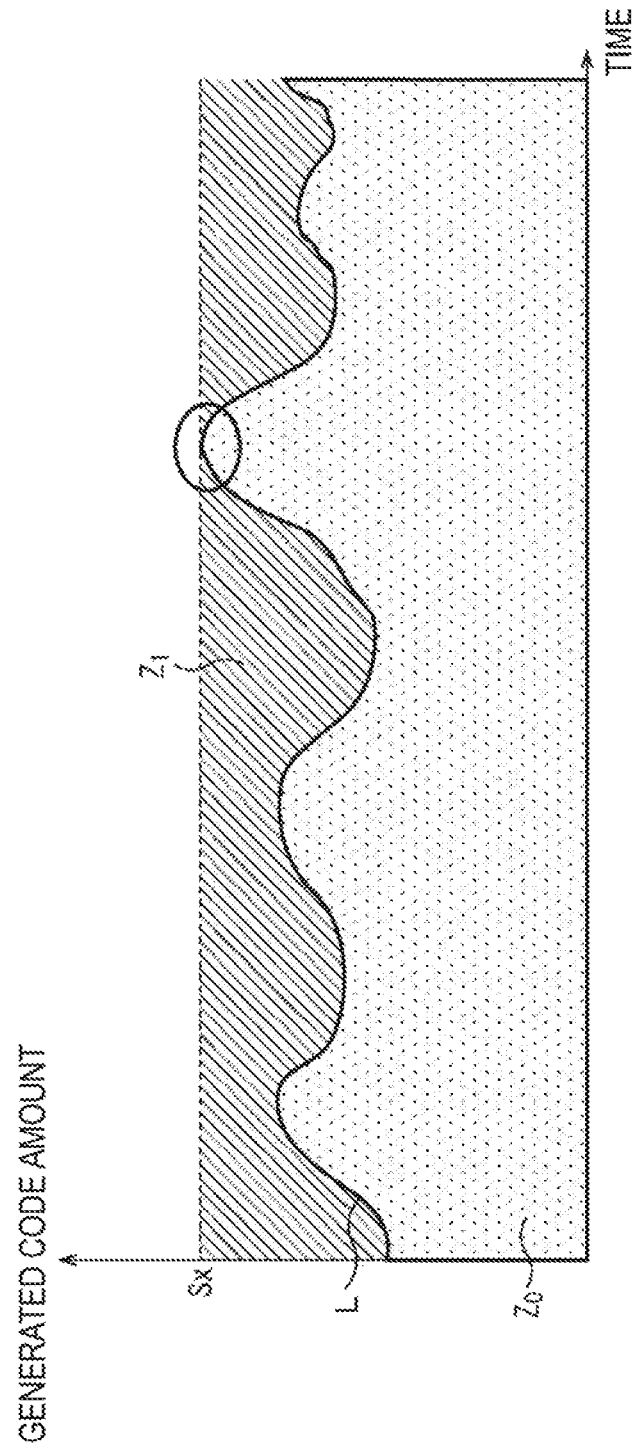
FIG. 20 is an explanatory diagram illustrating a ratio of null packets to a generated code amount.

This form is illustrated in FIG. 20. A waveform L in FIG. 20 is an example indicating a relation of a generated code amount in normal digital broadcasting on the vertical axis with respect to an elapsed time on the horizontal axis. An area of a range Z0 equal to or less than the waveform L is a sum of the generated code amount. That is, as indicated by the waveform L, the generated code amount which has a generated code amount Sx which is the fixed bit rate of the physical layer as a maximum value varies.

In the physical layer, however, it is necessary to execute transmission at the fixed bit rate. Therefore, since the code amount is insufficient at timings other than a timing at which the code amount becomes the generated code amount Sx in which the waveform L has the maximum value, a null packet is inserted. That is, as illustrated in FIG. 20, at the timings other than the timing of the generated code amount Sx which is the maximum value, a range Z1 equal to or greater than the waveform L and less than the maximum value of the generated code amount Sx is a code amount of the null packet which is invalid data.

Incidentally, as described above, in ATSC 3.0, a restricted bandwidth is requested to be efficiently used. Thus, since null packets which are invalid data cause a reduction in transmission efficiency, it is preferable not to use the null packets.

Ideally, the same generated code amount as a bandwidth ensured in the physical layer is considered to be allocated. Incidentally, since a generated code amount varies every moment in transmission of digital broadcasting, it is necessary to control the generated code amount with high precision in realtime. Thus, the allocation was not practical.

Accordingly, for example, in DVB-T2, null packet deletion is realized to detect null packets in the physical layer and delete the null packets. In this scheme, plural connection is realized in a seemingly widened bandwidth and a greater code amount can be generated.

Even in this case, however, a control scheme for a code amount between a generated code amount and the physical layer has not been established. Therefore, it is difficult to control an optimum code amount while ensuring delay of data in which a delay time up to encoding and decoding has to be within a constant time as in broadcasting signals to be constantly maintained. In general, this scheme is not used.

Accordingly, it is possible to improve transmission efficiency by transmitting non-realtime (NRT) data such as accumulation type content or an application program instead of a null packet along with real time (RT) data formed from stream type data which is a broadcasting program.

<Configuration Example of Second Transmission Device>

Figure 21:
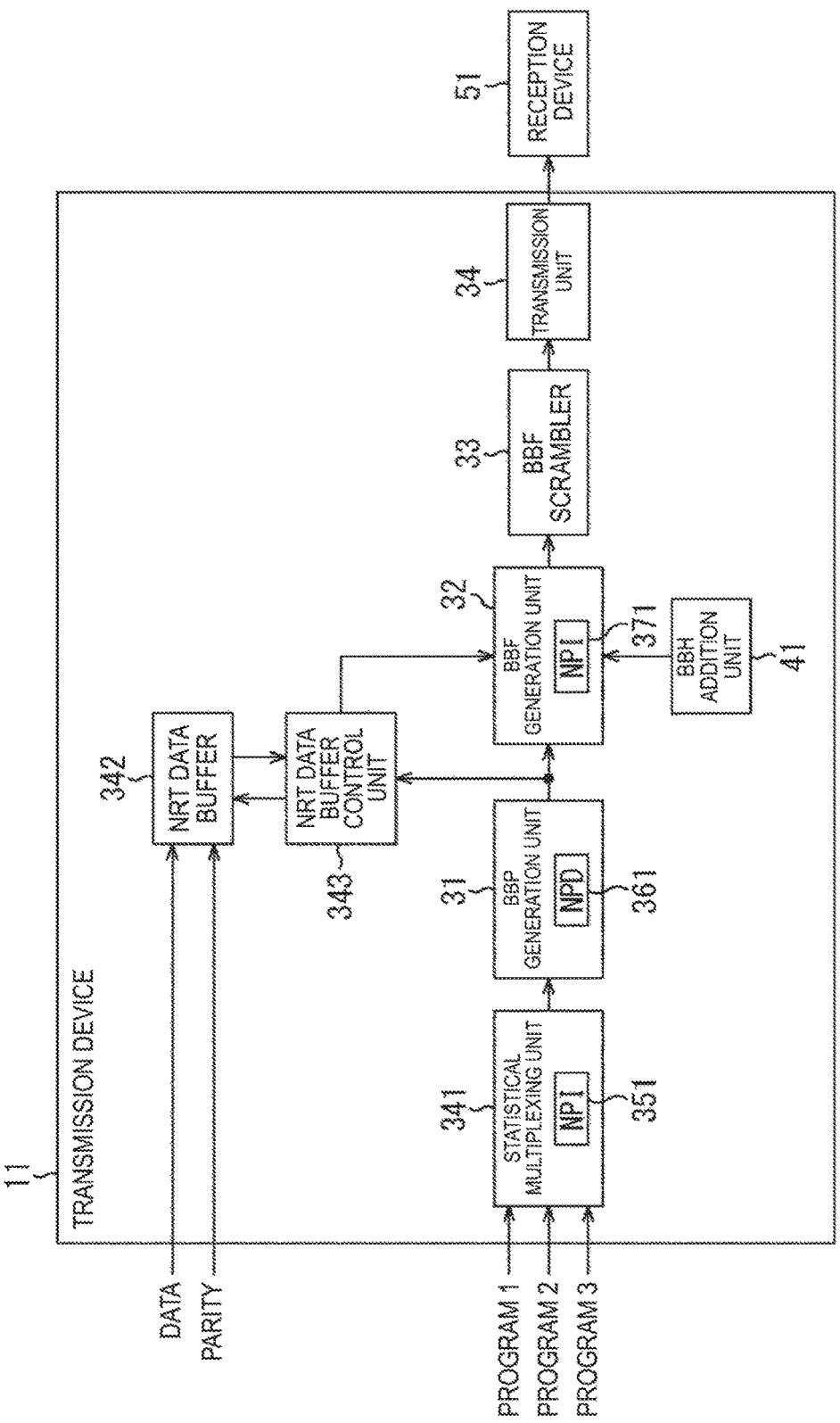
FIG. 21 is an explanatory diagram illustrating a second configuration example of the transmission device to which the present technology is applied.

FIG. 21 illustrates a configuration example of the transmission device 11 configured to transmit RT data and transmit non-realtime (NRT) data such as accumulation type content or an application program instead of a null packet generated with the transmission of the RT data. The same names and reference numerals are given to configurations having the same functions as the transmission device 11 in FIG. 1, and the description thereof will be appropriately omitted.

The transmission device 11 in FIG. 21 is different from the transmission device 11 in FIG. 1 in that a statistical multiplexing unit 341, an NRT data buffer 342, and an NRT data buffer control unit 343 are newly provided. The BBP generation unit 31 further includes a null packet deletion (NPD) 361 that deletes a null packet as necessary. The BBF generation unit 32 further includes a null packet insertion (NPI) 371 that adds a null packet corresponding to a code amount insufficient for a fixed bit rate of the physical layer in the generated BBF.

When inputs of broadcasting signals of, for example, programs 1 to 3 which are RT data and are formed from broadcasting programs are received, the statistical multiplexing unit 341 generates one piece of transmission data by controlling encoding of a video signal and an audio signal so that quality (mainly, image quality) of each program is optimized in a range which does not exceed the fixed bit rate of the physical layer from a statistical code amount. Thus, for example, as illustrated in FIG. 20, the code amount is adjusted to the generated code amount indicated by the waveform L in which the maximum value Sx of the generated code amount is the fixed bit rate of the physical layer. The statistical multiplexing unit 341 includes the NPI 351. At the time of encoding, the statistical multiplexing unit 341 controls the NPI 351 such that the null packet is inserted into a portion in which a code amount is insufficient for the fixed bit rate to be the fixed bit rate.

The BBP generation unit 31 identifies the types of input packets, generates BBPs by collecting the plurality of input packets according to the identified types, and supplies the generated BBPs to the BBF generation unit 32 and the NRT data buffer control unit 343. At this time, the BBP generation unit 31 controls the NPD 361 such that the null packet inserted by the above-described NPI 351 is deleted as necessary and also supplies information regarding the code amount of the deleted null packet to the NRT data buffer control unit 343.

The NRT data buffer 342 receives an input of NRT data such as data of accumulation type content or a parity which is non-realtime data and temporarily stores the NRT data. Another piece of data may be used as the NRT data as long as the data is data or a program handled in non-realtime. For example, an application program may be used.

The NRT data buffer control unit 343 requests the NRT data with a corresponding code amount from the NRT data buffer 342 based on the BBP supplied from the BBP generation unit 31 and the information regarding the code amount corresponding to the null packet deleted by the NPD 361. At this time, the NRT data buffer 342 reads the NRT data according to the code amount requested by the NRT data buffer control unit 343 to the NRT data buffer control unit 343. Thus, the NRT data buffer control unit 343 generates the BBPs of the NRT data based on the NRT data supplied from the NRT data buffer 342 and supplies the BBPs to the BBF generation unit 32.

The BBF generation unit 32 generates the BBFs by collecting the BBPs formed of the necessary RT data and the BBPs formed of the NRT data so that a predetermined frame length is realized and supplies the generated BBFs to the BBF scrambler 33. At this time, the BBF generation unit 32 controls the BBH addition unit 41 such that the BBH addition unit 41 generates and adds BBHs which are the headers of the BBFs. The BBF generation unit 32 controls the NPI 371 such that the null packet corresponding to the code amount insufficient for the fixed bit rate of the physical layer in the generated BBF is added as necessary.

<BBFs Including BBPs of RT Data and BBPs of NRT Data>

Figure 22:
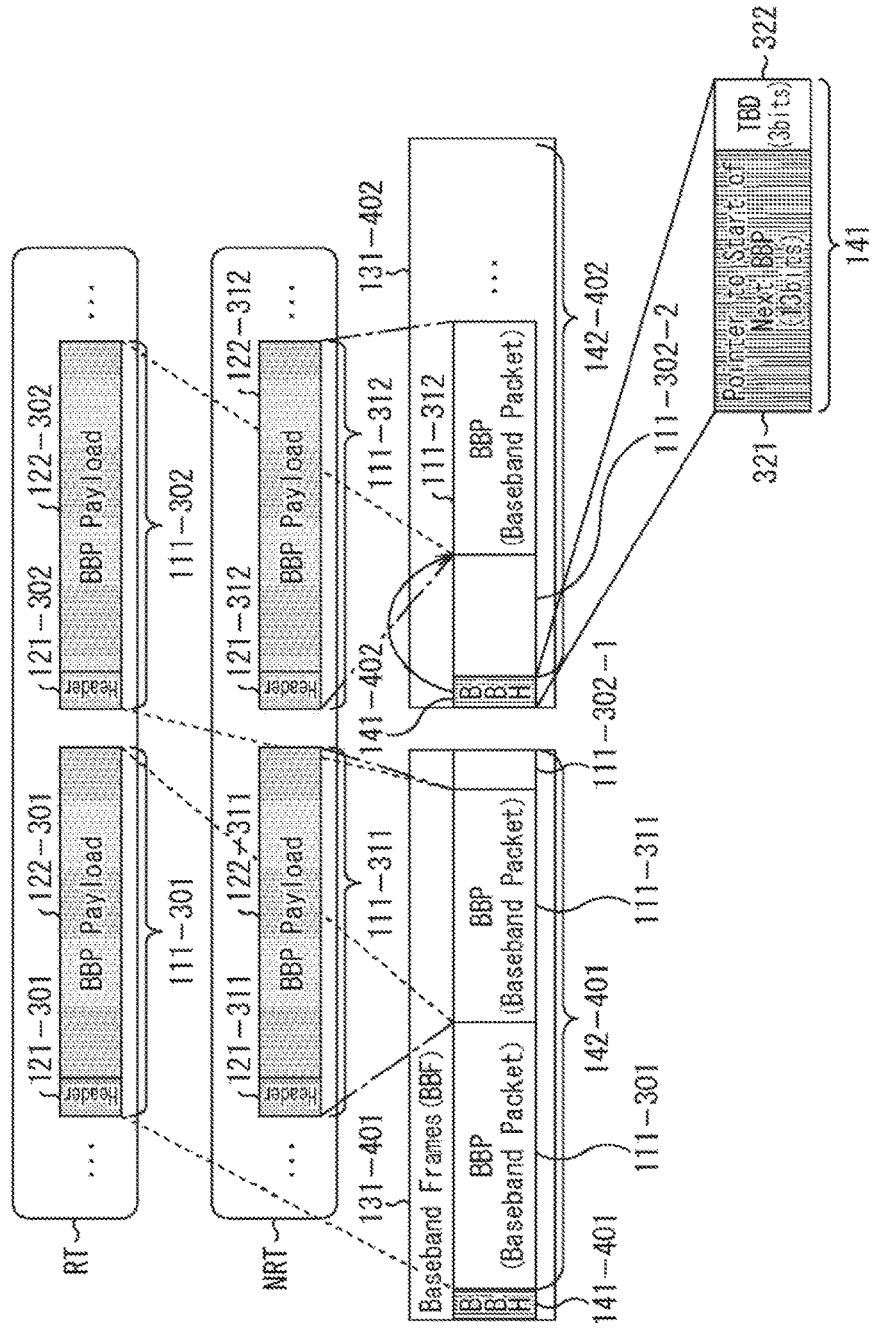
FIG. 22 is an explanatory diagram illustrating a method of generating the BBF based on the BBP of RT data and the BBP of NRT data.

For example, as illustrated in FIG. 22, the BBF generation unit 32 generates the BBFs including the BBPs of the RT data and the BBPs of the NRT data.

For example, when BBPs 111-301, 111-302, and the like of RT data configured to include headers 121-301, 121-302, and the like and BBP payloads 122-301, 122-302, and the like, as illustrated in the uppermost stage of FIG. 22 and BBPs 111-311, 111-312, and the like of the NRT data configured to include headers 121-311, 121-312, and the like and BBP payloads 122-311, 122-312, and the like, as illustrated in the second stage of FIG. 22 are input, the BBF generation unit 32 generates BBFs 131-401, 131-402, and the like, as illustrated in the third stage of FIG. 22.

That is, as illustrated in the third stage from the top of FIG. 22, the BBF generation unit 32 configures the BBFs 131-401, 131-402, and the like with a data length set according to the packet length and the coding rate of the input packet. More specifically, for example, the BBF generation unit 32 alternately stores the BBPs 111 of the RT data and the BBPs 111 of the NRT data in such a manner that the BBH 141-401 is stored at the beginning position of the BBF 131-401, the BBP 111-301 of the RT data is stored at the rear of the BBH 141-401 so that the BBF has the set data length, and the BBP 111-311 of the NRT data is stored at the rear of the BBP 111-301. At this time, as illustrated in the third stage of FIG. 22, when only a midway part of the BBP 111-302 is stored, the midway part is stored as a BBP 111-302-1, a BBH 141-402 is stored at the beginning of the subsequent BBF 131-402, and the rear part of the BBP 111-302 is stored as a BBP 111-302-2. Then, the BBF generation unit 32 continuously repeats a process of alternately storing the BBP 111 of the RT data and the BBP 111 of the NRT data so that the BBPs 111-313 and the like until the BBF 142-402 has the data length. Of course, when one of the NRT data and the RT data does not exist, the BBP of one piece of the existing data is stored. Any one of the RT data and the NRT data may be set as beginning data.

At this time, the BBF generation unit 32 controls the BBH addition unit 41 such that the BBH 141 having a configuration example illustrated in the lower right of FIG. 22 is stored at the beginning position of each BBF 131. The BBH 141 is the same as the BBH 141 in FIG. 17, and thus the description thereof will be omitted.

At this time, the NRT data with the code amount completely identical to the deleted null packet in regard to the fixed bit rate of the physical layer may not be acquired in some cases. In this case, the NPI 371 is controlled to insert the null packet with an insufficient code amount.

<Configuration Example of Second Reception Device>

Figure 23:
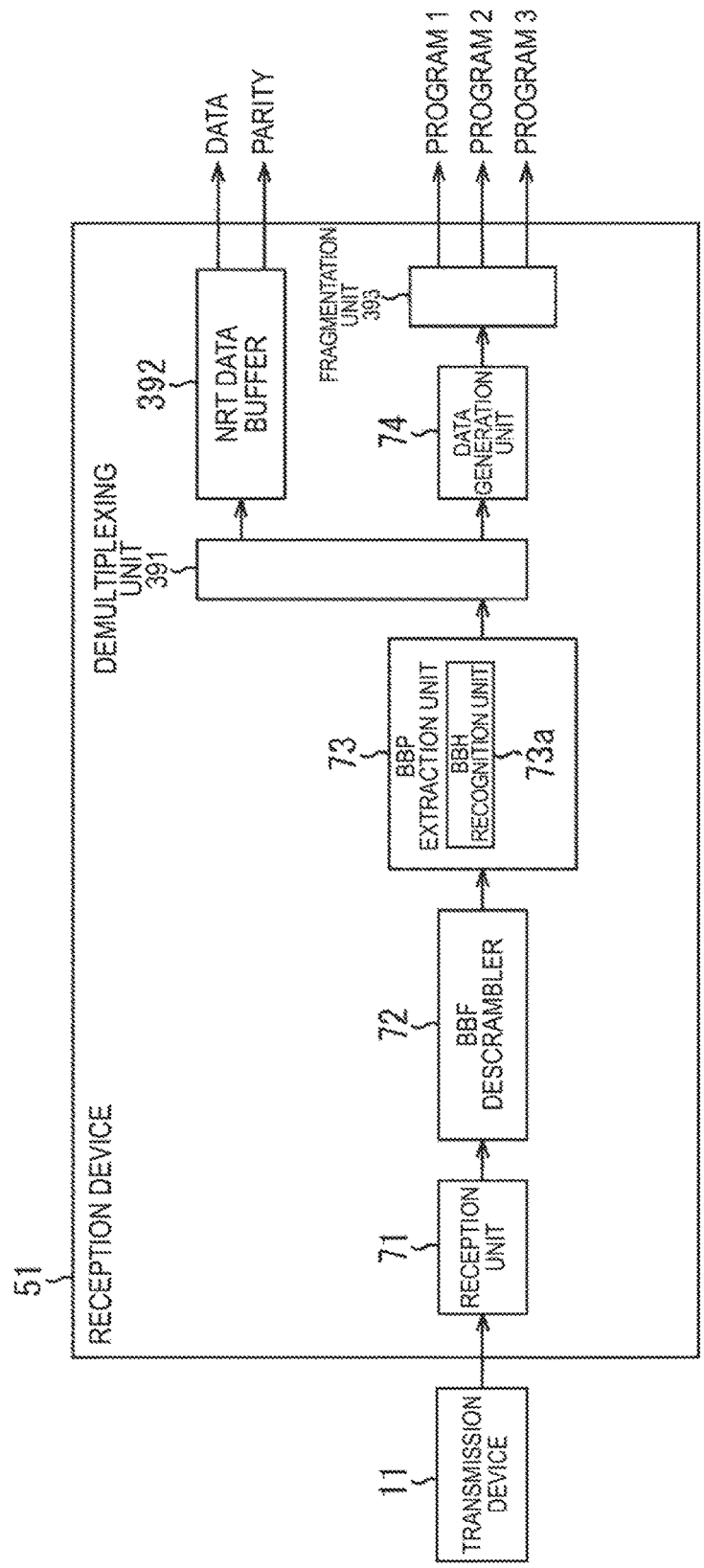
FIG. 23 is an explanatory diagram illustrating a second configuration example of the reception device to which the present technology is applied.

Next, a second configuration example of a reception device that receives the BBFs transmitted from the transmission device 11 in FIG. 21, generates the BBPs from the BBFs, generates the data input from the BBPs, and demultiplexes and outputs programs 1 to 3 which are broadcasting programs from the data will be described with reference to FIG. 23. In a reception device 51 in FIG. 23, the same names and reference numerals are given to configurations having the same functions as the reception device in FIG. 2, and the description thereof will be appropriately omitted. That is, the reception device 51 in FIG. 23 is different from the reception device 51 in FIG. 2 in that a demultiplexing unit 391, an NRT data buffer 392, and a fragmentation unit 393 are provided.

The BBP extraction unit 73 includes a BBH recognition unit 73*a*. The BBP extraction unit 73 controls the BBH recognition unit 73*a* such that the BBH recognition unit 73*a* recognizes information regarding the BBHs which are the headers of the BBFs. The BBP extraction unit 73 extracts the BBPs from the BBFs based on the recognized information regarding the BBHs and supplies the BBPs to the demultiplexing unit 391.

The demultiplexing unit 391 identifies whether the extracted BBPs are the RT data or the NRT data and demultiplexes the BBPs, supplies the RT data to the data generation unit 74, and supplies the NRT data to the NRT data buffer 392.

The data generation unit 74 restores and generates the transmitted packets input to the transmission device 11 which is a transmission source from the BBPs of the RT data supplied from the BBP extraction unit 73, and outputs the packets.

On the other hand, the NRT data buffer 392 outputs the NRT data which is the stored parity or non-realtime data as necessary.

<Transmission and Reception Processes by Transmission Device in FIG. 21 and Reception Device in FIG. 23>

Figure 24:
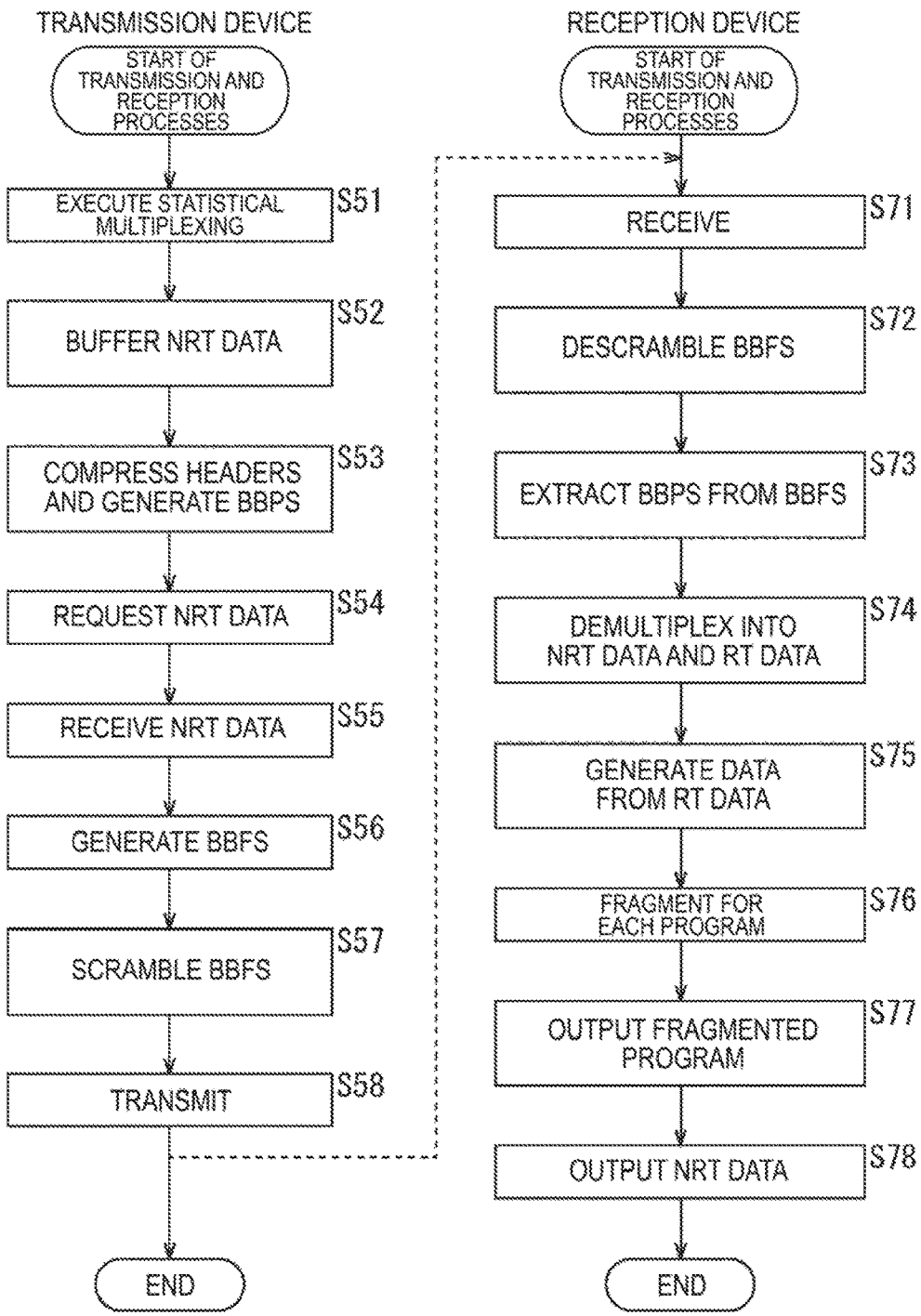
FIG. 24 is a flowchart for describing transmission and reception processes executed by a second transmission device and a second reception device according to the present technology.

Next, transmission and reception processes by the transmission device 11 in FIG. 21 and the reception device 51 in FIG. 23 will be described with reference to the flowchart of FIG. 24.

In step S51, when inputs of broadcasting signals of, for example, programs 1 to 3 which are RT data and are formed from broadcasting programs are received, the statistical multiplexing unit 341 generates one piece of transmission data by controlling encoding of a video signal and an audio signal so that quality (mainly image quality) of each program is optimized in a range which does not exceed the fixed bit rate of the physical layer from a statistical code amount and outputs the transmission data to the BBP generation unit 31. At this time, at the time of encoding, the statistical multiplexing unit 341 controls the NPI 351 such that the null packet is inserted into a portion in which a code amount is insufficient for the fixed bit rate to be the fixed bit rate.

In step S52, the NRT data buffer 342 receives and buffers an input of data such as accumulation type content or an application program or the NRT data such as a parity.

In step S53, the BBP generation unit 31 generates the BBPs through the above-described processes based on the input packets and supplies the BBPs to the BBF generation unit 32. At this time, the BBP generation unit 31 supplies the information regarding the code amount of the null packet deleted by the NPD 361 to the NRT data buffer control unit 343.

More specifically, the BBP generation unit 31 identifies the types of input packets. When the input packets are the IP packets, the BBP generation unit 31 generates the BBPs in one of the short packet mode described with reference to FIG. 7, the variable length mode described with reference to FIG. 4, and the additional variable length mode described with reference to FIG. 9 according to the packet lengths of the input packets. When the input packets are the TS packets, the BBP generation unit 31 generates the BBPs in the TS packet mode described with reference to FIG. 11 or 14. Further, when the input packets are neither the IP packets nor the TS packets, the BBP generation unit 31 registers the information regarding the type recognized in the protocol header VH3 and generates the BBPs as the BBPs are generated from the bit stream packets described with reference to FIG. 15. The BBP generation unit 31 generates the header according the fragmentation mode or the null packet deletion mode as necessary, generates the BBPs, and outputs the BBPs to the BBF generation unit 32.

At this time, when 3 low-order bits of the protocol header VH3 are 001, 010, and 011 and IPv4 NRT (Header Compression), IPv6 NRT (Header Compression), and TS NRT (Header Compression) are used, the BBP generation unit 31 compresses the headers and generates the BBPs of the NRT data. When 3 low-order bits of the protocol header VH3 are 100, 101, and 110 and IPv4 NRT, IPv6 NRT, and TS NRT are used, the BBP generation unit 31 generates the BBPs of the NRT data without compressing the headers.

Further, the BBP generation unit 31 controls the NPD 361 such that the inserted null packets are deleted and outputs the information regarding the code amount of the deleted null packets to the NRT data buffer control unit 343.

In step S54, the NRT data buffer control unit 343 requests the code amount corresponding to the null packets deleted by the NPD 361 based on the BBPs supplied from the BBP generation unit 31 and requests the NRT data with the corresponding code amount from the NRT data buffer 342.

In step S55, the NRT data buffer 342 reads the NRT data according to the code amount requested from the NRT data buffer control unit 343 to the NRT data buffer control unit 343. Thus, the NRT data buffer control unit 343 receives the NRT data supplied from the NRT data buffer 342, generates the BBPs based on the NRT data, and supplies the BBPs to the BBF generation unit 32.

In step S56, the BBF generation unit 32 generates the BBFs and supplies the BBFs to the BBF scrambler 33 based on the BBPs formed from the RT data and the BBPs formed from the NRT data, for example, as described with reference to FIG. 22 described above. At this time, the BBF generation unit 32 controls the NPI 371 such that the null packet corresponding to the code amount insufficient for the fixed bit rate of the physical layer in the generated BBF is added as necessary.

In step S57, the BBF scrambler 33 scrambles the supplied BBFs and supplies the scrambled BBFs to the transmission unit 34.

In step S58, the transmission unit 34 transmits the scrambled BBFs to the reception device 51.

In step S71, the reception unit 71 of the reception device 51 receives the BBFs transmitted from the transmission device 11 and supplies the BBFs to the BBF descrambler 72.

In step S72, the BBF descrambler 72 descrambles the supplied scrambled BBFs and supplies the descrambled BBFs to the BBP extraction unit 73.

In step S73, the BBP extraction unit 73 sequentially extracts the BBPs from the descrambled BBF. More specifically, the BBP extraction unit 73 controls the BBH recognition unit 73a such that the BBH recognition unit 73a recognizes the information regarding the pointer recorded in the BBH in the BBF and indicating the start positions of the BBPs newly stored from its beginning for each BBF, sequentially extracts the BBPs in the BBF, and supplies the BBPs to the data generation unit 74.

In step S74, the demultiplexing unit 391 sequentially demultiplexes the extracted BBPs into the BBPs of the RT data and the BBPs of the NRT data and outputs the BBPs of the RT data and the BBPs of the NRT data to the data generation unit 74 and the NRT data buffer 392, respectively.

In step S75, the data generation unit 74 generates the transmission data from the BBPs of the RT data supplied from the demultiplexing unit 391.

In step S76, the fragmentation unit 393 fragments the transmission data supplied from the data generation unit 74 into programs 1 to 3 which are broadcasting programs.

In step S77, the fragmentation unit 393 outputs programs 1 to 3 which are the fragmented broadcasting programs.

In step S78, the NRT data buffer 392 appropriately outputs the data such as accumulation type content or an application program which is the NRT data or the parity at a necessary timing.

Through the foregoing processes, the NRT data is transmitted instead of the null packets generated in the fixed bit rate of the physical layer when the RT data is transmitted. Therefore, for example, as illustrated in FIG. 25, it is possible to reduce the null packets and improve transmission efficiency.

Figure 25:
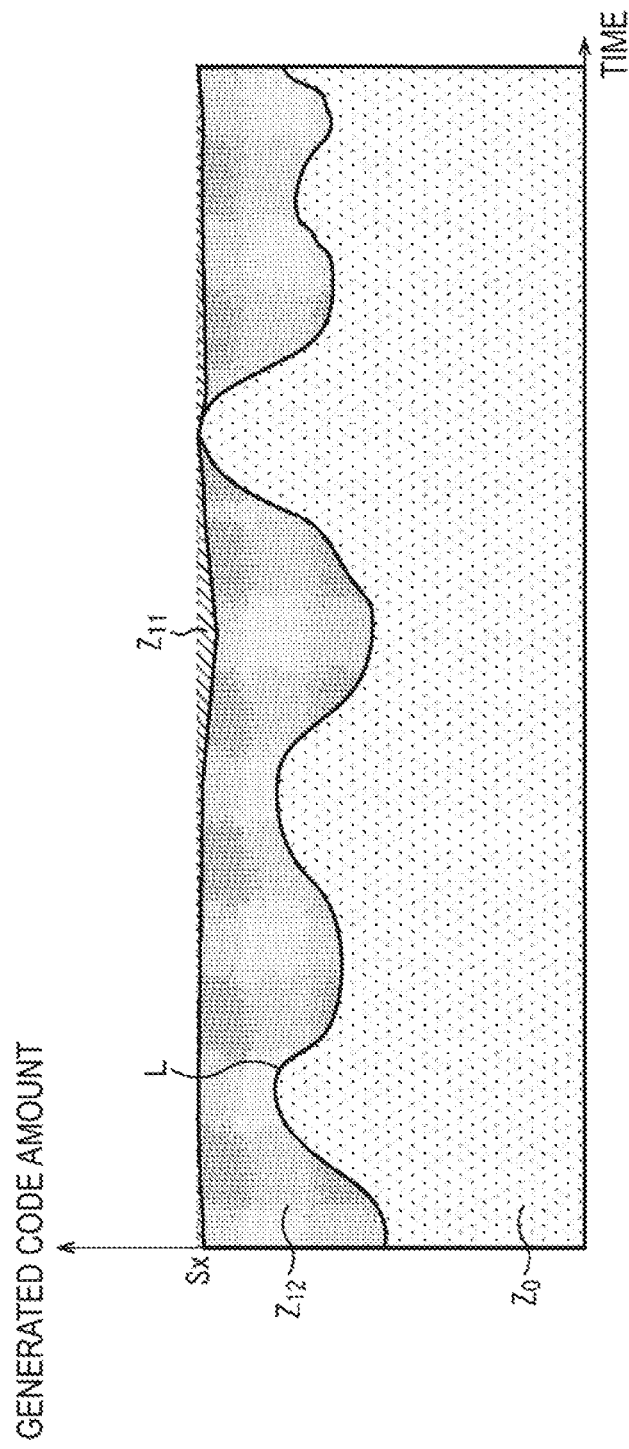
FIG. 25 is a flowchart for describing advantageous effects by the transmission and reception processes executed by the second transmission device and the second reception device according to the present technology.

FIG. 25 corresponds to the waveform L of FIG. 20. That is, at timings other than the timing of the generated code amount Sx which is the maximum value, a range Z12 in a range from the waveform L to the maximum value of the generated code amount Sx is considered to be a code amount of the NRT data instead of the null packets. Here, since the NRT data with a code amount completely corresponding to the code amount considered to be the null packets may not be included, a range Z11 above the range Z12 is a code amount of the reduced null packets. In this way, the ranges Z0 and Z12 are valid transmitted packets. As a result, since substantially the entire range of the maximum value Sx of the generated code amount of the fixed bit rate can be used, it is possible to improve the transmission efficiency.

Modification Examples

The example in which the NRT data and the RT data are input with separate systems has been described above. However, The NRT data and the RT data may be processed with one system through bidirectional multiplexing communication. However, at this time, systems for the packets configuring the NRT data and the RT data are divided into a system for the IP packets and a system for the TS packets.

Figure 26:
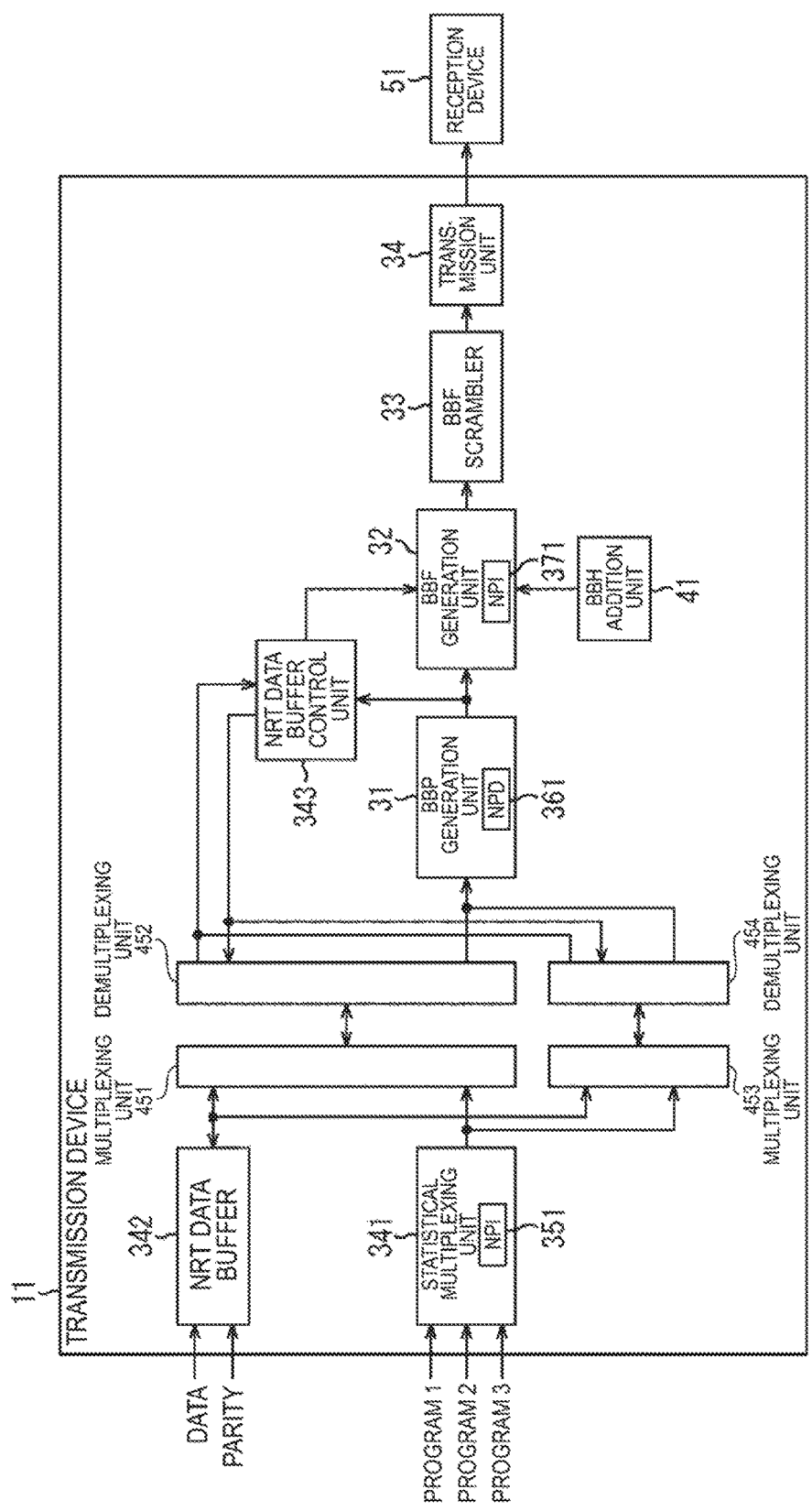
FIG. 26 is an explanatory diagram illustrating a modification example of the second configuration example of the transmission device to which the present technology is applied.

FIG. 26 illustrates a configuration example of the transmission device 11 configured to input the NRT data and the RT data with one system. Here, the transmission device 11 in FIG. 26 is different from the transmission device 11 in FIG. 21 in that multiplexing units 451 and 453 are provided at the rear stage of the statistical multiplexing unit 341 and the NRT data buffer 342 and demultiplexing units 452 and 454 are provided at the front stage of the BBP generation unit 31 and the NRT data buffer control unit 343.

The multiplexing unit 451 multiplexes the IP packets of the output of the statistical multiplexing unit 341 which is the RT data and the IP packet of the output of the NRT data buffer 342 which is the NRT data and outputs the IP packets to the demultiplexing unit 452.

The demultiplexing unit 452 demultiplexes the multiplexed data, outputs the IP packets of the RT data to the BBP generation unit 31, and outputs the IP packet of the NRT data to the NRT data buffer control unit 343. Here, at this time, the NRT data buffer control unit 343 is assumed to supply the NRT data buffer 342 with information for requesting the NRT data of the code amount corresponding to the deleted null packets from the demultiplexing unit 452 via the multiplexing unit 451.

Similarly, the multiplexing unit 453 multiplexes the TS packets of the output of the statistical multiplexing unit 341 which is the RT data and the TS packet of the output of the NRT data buffer 342 which is the NRT data and outputs the TS packets to the demultiplexing unit 454.

The demultiplexing unit 454 demultiplexes the multiplexed data, outputs the TS packets of the RT data to the BBP generation unit 31, and outputs the TS packet of the NRT data to the NRT data buffer control unit 343. Here, at this time, the NRT data buffer control unit 343 is assumed to supply the NRT data buffer 342 with information for requesting the NRT data of the code amount corresponding to the deleted null packets from the demultiplexing unit 454 via the multiplexing unit 453.

In this case, the reception device 51 can execute the same handling as the reception device 51 in FIG. 23. The transmission and reception processes are the same as the processes described with reference to FIG. 25 except that the IP packets and the TS packets of the NRT data and the RT data are processed with one system, and thus the description thereof will be omitted.

An embodiment of the disclosure is not limited to the embodiments described above, and various changes and modifications may be made without departing from the scope of the disclosure.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

Additionally, the present technology may also be configured as below.

(1)

A transmission device that generates an encoded signal based on realtime data using a predetermined fixed bit rate as a maximum code amount and transmits the encoded signal into which non-realtime data with an insufficient code amount is inserted when a code amount of the generated encoded signal is insufficient for the maximum code amount.

(2)

A reception device that receives an encoded signal which is generated by encoding realtime data using a predetermined fixed bit rate as a maximum code amount and into which non-realtime data with an insufficient code amount is inserted when a code amount of the generated encoded signal is insufficient for the maximum code amount.

(3)

A transmission device including:

an encoding unit configured to generate an encoded signal by encoding realtime data to be transmitted within a constant delay time so that a predetermined fixed bit rate becomes a maximum code amount and insert a null packet at a code amount insufficient for the fixed bit rate;

a packet generation unit configured to execute packetizing by deleting the null packet in the encoded signal of the realtime data;

a non-realtime data supply unit configured to supply a packet of non-realtime data corresponding to a code amount of the null packet deleted by the packet generation unit;

a frame data generation unit configured to generate frame data with a predetermined length based on a packet of the realtime data and the packet of the non-realtime data; and a transmission unit configured to transmit the frame data.

(4)

The transmission device according to (3), wherein the encoding unit generates the encoded signal by controlling the code amount so that quality of each broadcasting program is optimized in a range which does not exceed the maximum code amount of the predetermined fixed bit rate from a statistical code amount of the realtime data of a plurality of broadcasting programs.

(5)

The transmission device according to (3) or (4), wherein the encoding unit generates the encoded signal by controlling the code amount so that quality of each broadcasting program is optimized in a range which does not exceed the maximum code amount of the predetermined fixed bit rate from a statistical code amount of the realtime data of a plurality of broadcasting programs, and includes a null packet insertion unit that inserts the null packet when the code amount is insufficient for the maximum code amount.

(6)

The transmission device according to any of (3) to (5), wherein the packet generation unit further includes a null packet deletion unit that deletes the null packet in the encoded signal of the realtime data.

(7)

The transmission device according to (6), wherein the packet generation unit supplies the non-realtime data supply unit with information regarding a code amount of the null packet deleted from the encoded signal of the realtime data by the null packet deletion unit.

(8)

The transmission device according to (7), further including:

a non-realtime data buffer configured to store the non-realtime data, wherein the non-realtime data supply unit requests the non-realtime data with a code amount corresponding to the code amount of the null packet deleted from the encoded signal of the realtime data from the non-realtime data buffer, acquires the non-realtime data with the code amount corresponding to the code amount of the deleted null packet in response to the request from the non-realtime data buffer, and supplies the non-realtime data to the frame data generation unit.

(9)

The transmission device according to any of (3) to (8), wherein the frame data generation unit generates frame data with a predetermined length based on the packet of the realtime data and the packet of the non-realtime data, and the transmission device further includes a null packet insertion unit configured to insert the null packet when the frame data is insufficient for the maximum code amount of the predetermined bit rate.

(10)

The transmission device according to any of (3) to (9), including:

a multiplexing unit configured to multiplex the realtime data and the non-realtime data to generate a multiplexed signal; and a demultiplexing unit configured to demultiplex the multiplexed signal generated by the multiplexing unit into the realtime data and the non-realtime data.

(11)

A transmission method including:

generating an encoded signal by encoding realtime data to be transmitted within a constant delay time so that a predetermined fixed bit rate becomes a maximum code amount and inserting a null packet at a code amount insufficient for the fixed bit rate;

executing packetizing by deleting the null packet in the encoded signal of the realtime data;

supplying a packet of non-realtime data corresponding to a code amount of the deleted null packet;

generating frame data with a predetermined length based on a packet of the realtime data and the packet of the non-realtime data; and transmitting the frame data.

(12)

A reception device including:

a reception unit configured to receive frame data with a predetermined length which is generated based on a packet of realtime data which is transmission data to be transmitted within a constant delay time and is put into an encoded signal so that a predetermined fixed bit rate becomes a maximum code amount and a packet of non-realtime data with a code amount insufficient for the maximum code amount;

a demultiplexing unit configured to demultiplex the frame data with the predetermined length received by the reception unit into the packet of the realtime data and the packet of the non-realtime data;

a realtime data output unit configured to output the realtime data based on the packet of the realtime data; and a non-realtime data output unit configured to output the non-realtime data based on the packet of the non-realtime data.

(13) A reception method including:
receiving frame data with a predetermined length which is generated based on a packet of realtime data which is transmission data to be transmitted within a constant delay time and is put into an encoded signal so that a predetermined fixed bit rate becomes a maximum code amount and a packet of non-realtime data with a code amount insufficient for the maximum code amount;
demultiplexing the frame data with the predetermined length received by the reception unit into the packet of the realtime data and the packet of the non-realtime data;
outputting the realtime data based on the packet of the realtime data; and
outputting the non-realtime data based on the packet of the non-realtime data.

REFERENCE SIGNS LIST 11 transmission device
31 BBP generation unit
32 BBF generation unit
33 BBF scrambler
34 transmission unit
41 BBH addition unit
51 reception device
71 reception unit
72 BBF descrambler
73 BBP extraction unit
73a BBH recognition unit
74 input packet generation unit
341 statistical multiplexing unit
342 NRT data buffer
343 NRT data buffer control unit
351 NPI
361 NPD
371 NPI
391 demultiplexing unit
392 NRT data buffer
393 fragmentation unit
451 multiplexing unit
452 demultiplexing unit
453 multiplexing unit
454 demultiplexing unit

The invention claimed is:

1. A transmission device, comprising:
circuitry configured to:
generate a baseband frame that includes a header and data packets,
a data length of the data packets being determined based on a predetermined coding method with a fixed bit rate,
the data packets including at least one realtime (RT) packet that stores RT data and at least one non-realtime (NRT) packet that stores NRT data, and
the header including a pointer indicating a beginning position of one of the data packets in the baseband frame; and
a transmitter configured to transmit the baseband frame that is encoded using the predetermined coding method with the fixed bit rate.

2. A reception device, comprising:
a receiver configured to receive a baseband frame that is encoded using a predetermined coding method with a fixed bit rate,
the baseband frame including a header and data packets,
a data length of the data packets being determined based on the predetermined coding method with the fixed bit rate,
the data packets including at least one realtime (RT) packet that stores RT data and at least one non-realtime (NRT) packet that stores NRT data, and
the header including a pointer indicating a beginning position of one of the data packets in the baseband frame; and
circuitry configured to:
extract the data packets based on information included in the header;
obtain the RT data from the at least one RT packet; and
obtain the NRT data from the at least one NRT packet.

3. A transmission device, comprising:
circuitry configured to:
receive one or more realtime (RT) packets that store RT data;
determine a difference between a data length of the one or more RT packets and a maximum code amount of data packets of a baseband frame, the maximum code amount being determined based on a predetermined coding method with a fixed bit rate;
receive one or more non-realtime (NRT) packets that store NRT data, a data length of the one or more NRT packets being up to the determined difference; and
generate the baseband frame that includes a header and the data packets, including the one or more RT packets and the one or more NRT packets, the header including a pointer indicating a beginning position of one of the data packets in the baseband frame;
a transmitter configured to transmit the generated baseband frame that is encoded using the predetermined coding method with the fixed bit rate.

4. The transmission device according to claim 3,
wherein the circuitry is configured to control the data length of the one or more NRT packets so that quality of each broadcasting program is optimized in a range which does not exceed the maximum code amount of the predetermined coding method with the fixed bit rate from a statistical code amount of realtime data of a plurality of broadcasting programs.

5. The transmission device according to claim 3,
wherein the circuitry is configured to:
control the data length of the one or more NRT packets so that quality of each broadcasting program is optimized in a range which does not exceed the maximum code amount of the predetermined coding method with the fixed bit rate from a statistical code amount of realtime data of a plurality of broadcasting programs; and
include a null packet in the baseband frame when the data length of the one or more NRT packets is less than the difference between the data length of the one or more RT packets and the maximum code amount.

6. The transmission device according to claim 3,
wherein the circuitry is configured to:
receive the one or more RT packets that include null data; and
delete the null data in the one or more RT packets.

7. The transmission device according to claim 6,
wherein circuitry is configured to request receiving of the one or more non-realtime (NRT) packets for up to an amount corresponding to that of the deleted null data.

8. The transmission device according to claim 3, further comprising:
a data buffer configured to store the NRT data,
wherein the circuitry is configured to receive the NRT data for the one or more non-realtime (NRT) packets from the data buffer.

9. The transmission device according to claim 3,
wherein the circuitry is configured to include a null packet in the baseband frame when a total data length of the one or more RT packets and the one or more NRT packets is less than the maximum code amount.

10. The transmission device according to claim 3, comprising:
a multiplexer configured to multiplex the RT data and the NRT data to generate a multiplexed signal; and
a demultiplexer configured to demultiplex the multiplexed signal generated by the multiplexer into the RT data and the NRT data.

11. A transmission method, comprising:
receiving one or more realtime (RT) packets that store RT data;
determining a difference between a data length of the one or more RT packets and a maximum code amount of data packets of a baseband frame, the maximum code amount being determined based on a predetermined coding method with a fixed bit rate;
receiving one or more non-realtime (NRT) packets that store NRT data, a data length of the one or more NRT packets being up to the determined difference; and
generating, by circuitry of a transmission device, the baseband frame that includes a header and the data packets, including the one or more RT packets and the one or more NRT packets, the header including a pointer indicating a beginning position of one of the data packets in the baseband frame; and
transmitting, by a transmitter of a transmission device, the generated baseband frame that is encoded using the predetermined coding method with the fixed bit rate.

12. A reception device, comprising:
a receiver configured to receive a baseband frame that is encoded using a predetermined coding method with a fixed bit rate,
the baseband frame including a header and data packets,
a data length of the data packets being determined based on the predetermined coding method with the fixed bit rate,
the data packets including at least one realtime (RT) packet that stores RT data and at least one non-realtime (NRT) packet that stores NRT data, and
the header including a pointer indicating a beginning position of one of the data packets in the baseband frame; and
circuitry configured to:
demultiplex the baseband frame into the at least one RT packets and the at least one NRT packets;
output the RT data based on the at least one RT packet; and
output the NRT data based on the at least one NRT packet.

13. A reception method, comprising:
receiving, by a receiver of a reception device, a baseband frame that is encoded using a predetermined coding method with a fixed bit rate,
the baseband frame including a header and data packets,
a data length of the data packets being determined based on the predetermined coding method with the fixed bit rate,
the data packets including at least one realtime (RT) packet that stores RT data and at least one non-realtime (NRT) packet that stores NRT data, and
the header including a pointer indicating a beginning position of one of the data packets in the baseband frame; and
demultiplexing, by circuitry of the reception device, the baseband frame into the at least one RT packets and the at least one NRT packets;
outputting the RT data based on the at least one RT packet; and
outputting the NRT data based on the at least one NRT packet.

* * * * *